(12) United States Patent
Payne et al.

(10) Patent No.: US 10,194,776 B2
(45) Date of Patent: Feb. 5, 2019

(54) CLEANING CARTRIDGE AND HANDLING UNIT FOR CLEANING SYSTEM

(71) Applicant: Dakota Supplies Inc., Calgary (CA)

(72) Inventors: Vaughan Payne, Calgary (CA); Deborah Humphries, Calgary (CA)

(73) Assignee: Dakota Supplies Inc., Calgary (CA)

( * ) Notice: Subject to any disclaimer, the term of this patent is extended or adjusted under 35 U.S.C. 154(b) by 0 days.

(21) Appl. No.: 15/527,356

(22) PCT Filed: Dec. 18, 2015

(86) PCT No.: PCT/CA2015/051347
§ 371 (c)(1),
(2) Date: May 17, 2017

(87) PCT Pub. No.: WO2016/095053
PCT Pub. Date: Jun. 23, 2016

(65) Prior Publication Data
US 2017/0319042 A1  Nov. 9, 2017

Related U.S. Application Data

(60) Provisional application No. 62/096,650, filed on Dec. 24, 2014.

(51) Int. Cl.
| | | |
|---|---|---|
| *A47K 11/10* | (2006.01) | |
| *A47L 13/46* | (2006.01) | |
| *A47L 13/10* | (2006.01) | |
| *A47L 13/16* | (2006.01) | |
| *A47L 13/20* | (2006.01) | |
| *A47L 13/51* | (2006.01) | |
| *A47L 25/00* | (2006.01) | |
| *B64F 5/30* | (2017.01) | |

(52) U.S. Cl.
CPC ............. *A47K 11/10* (2013.01); *A47L 13/10* (2013.01); *A47L 13/16* (2013.01); *A47L 13/20* (2013.01); *A47L 13/46* (2013.01); *A47L 13/51* (2013.01); *A47L 25/00* (2013.01); *B64F 5/30* (2017.01); *Y02P 70/585* (2015.11)

(58) Field of Classification Search
CPC ......... A47K 11/10; A47L 13/46; A47L 13/51; A47L 13/10; A47L 13/16; A47L 13/20
USPC ....................................................... 15/176.1
See application file for complete search history.

(56) References Cited

U.S. PATENT DOCUMENTS

| | | |
|---|---|---|
| 2,841,809 A | 7/1958 | Oliver |
| 4,884,913 A | 12/1989 | Smith |
| 5,092,013 A | 3/1992 | Genovese |
| (Continued) | | |

*Primary Examiner* — Laura C Guidotti
(74) *Attorney, Agent, or Firm* — Marsh Fischmann & Breyfogle LLP; Jonathon A. Szumny

(57) ABSTRACT

A cleaning cartridge and a handling unit of a cleaning system are provided. The cleaning cartridge comprises an outer housing having a mouth; a cap for sealing the housing at the mouth; a stiffening component attached to the cap; and a cleaning element attached to the stiffening component, and the cartridge is receivable in and dispensable from the handling unit; the stiffening component has a compact position and an expanded position, and in the compact position, the stiffening component and cleaning element fit into the housing and the housing is sealable by the cap; and in the expanded position, the stiffening component expands the cleaning element to provide a cleaning surface.

27 Claims, 34 Drawing Sheets

(56) References Cited

U.S. PATENT DOCUMENTS

| | | |
|---|---|---|
| 8,769,757 B2 | 7/2014 | Payne |
| 2013/0036542 A1* | 2/2013 | Loughman ............. A47K 11/10 |
| | | 4/255.11 |
| 2013/0305470 A1* | 11/2013 | Payne .................... A47L 13/26 |
| | | 15/104.94 |

* cited by examiner

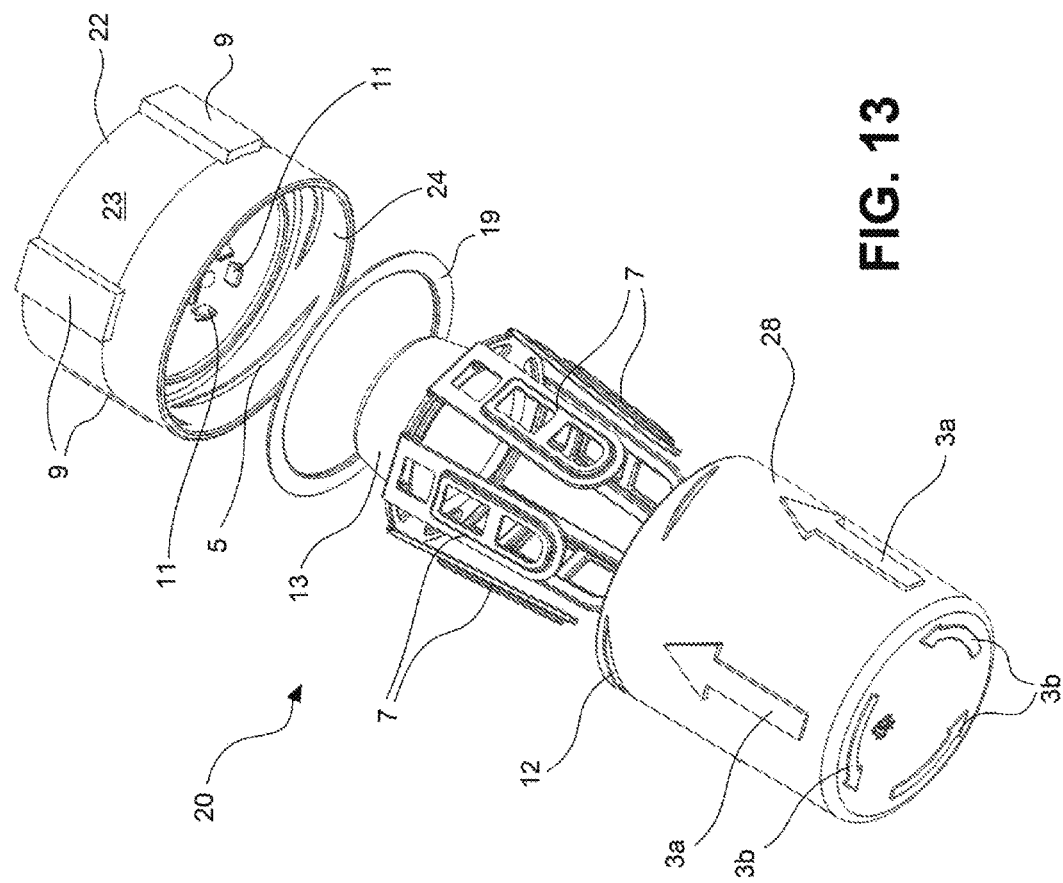

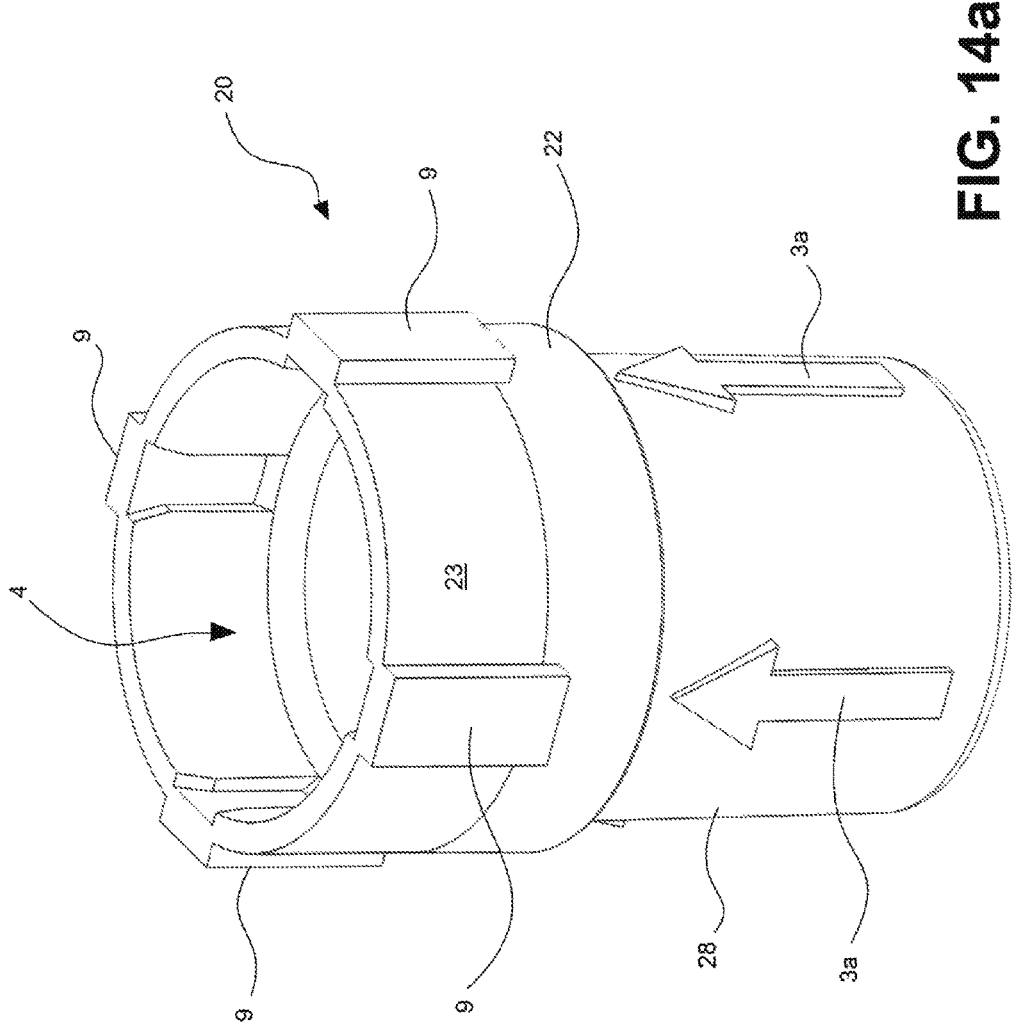

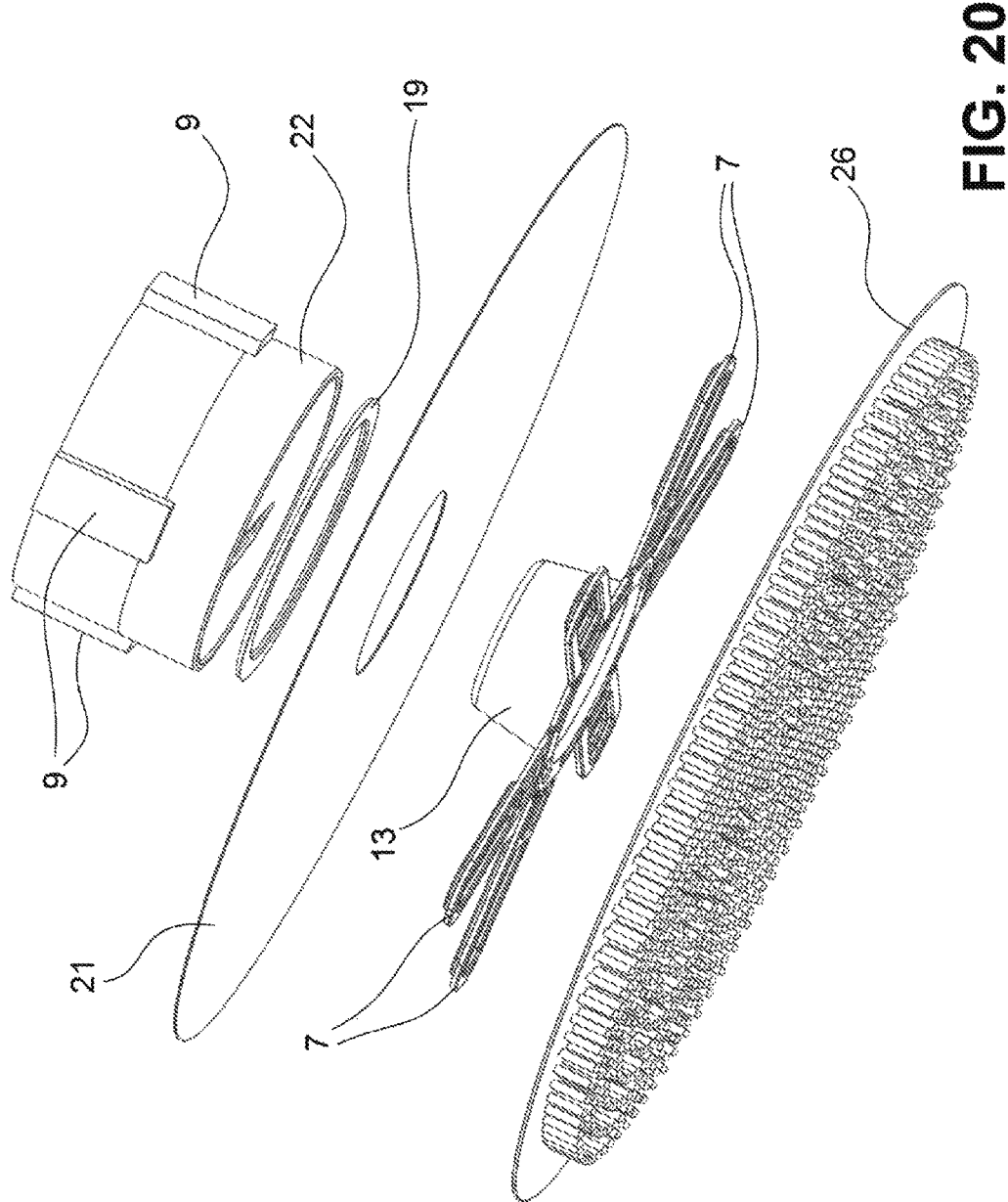

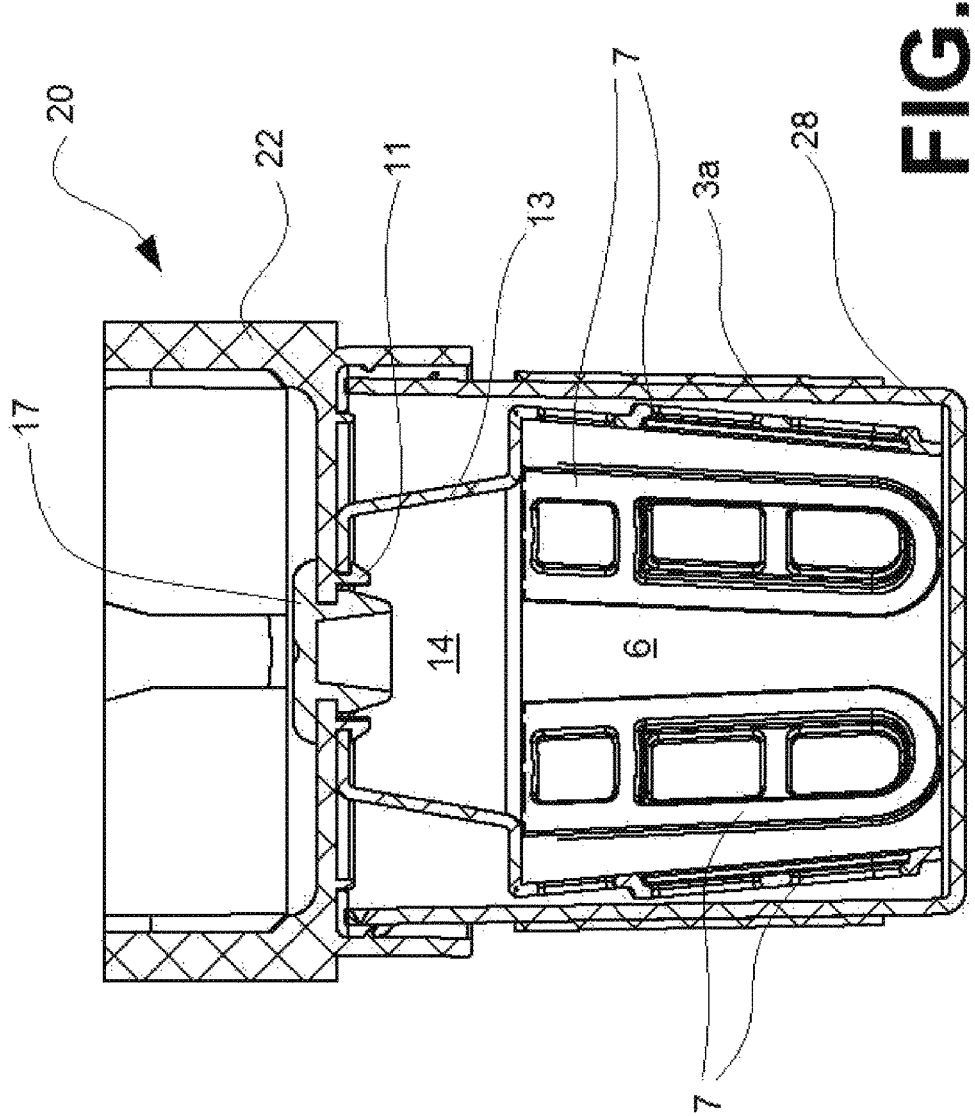

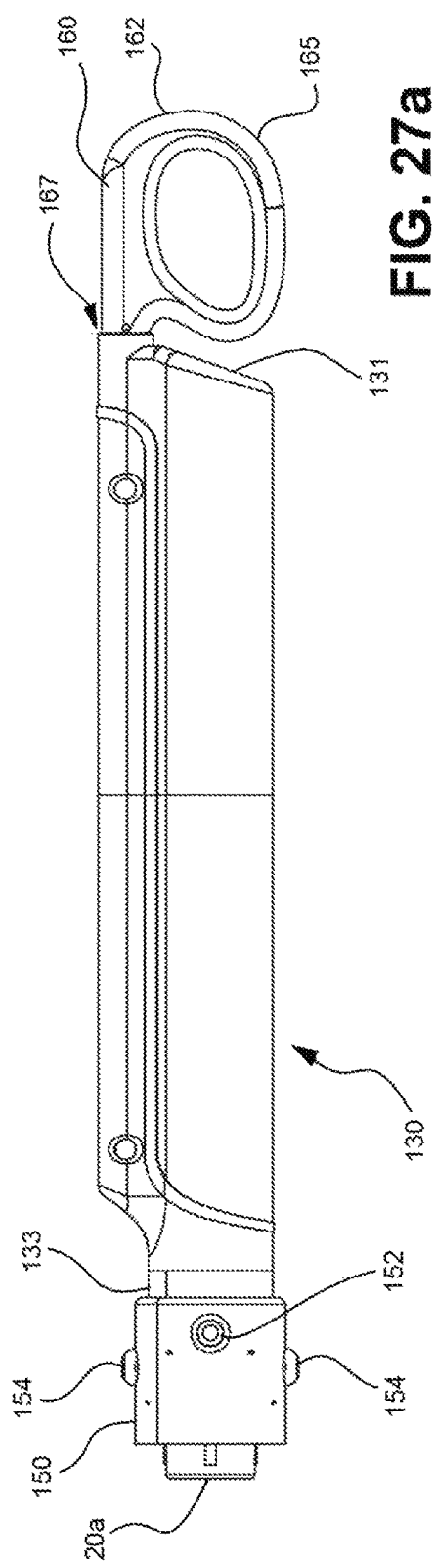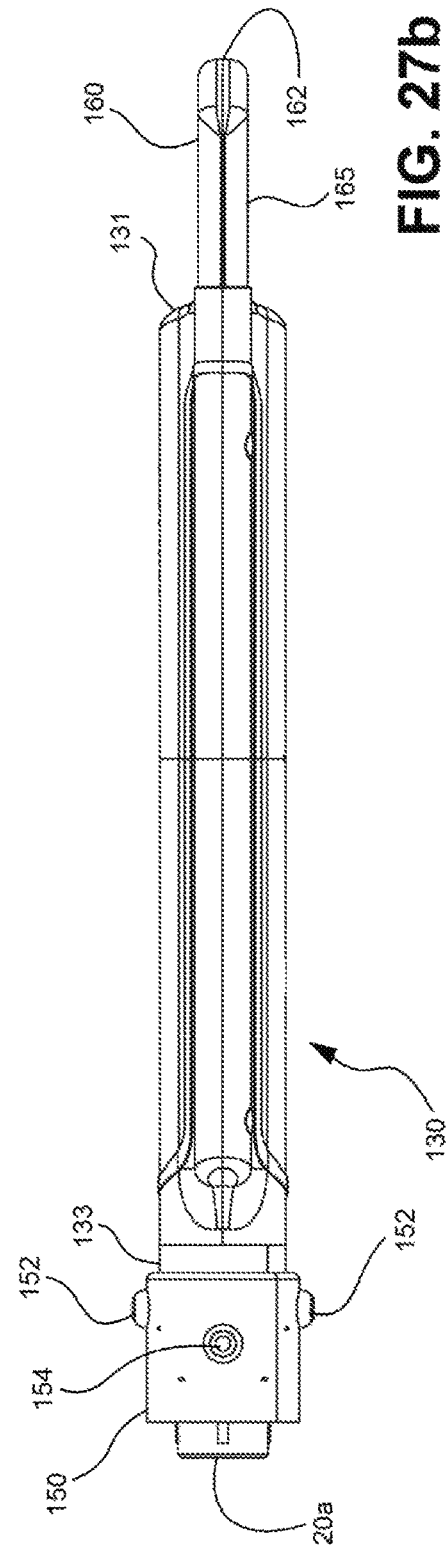

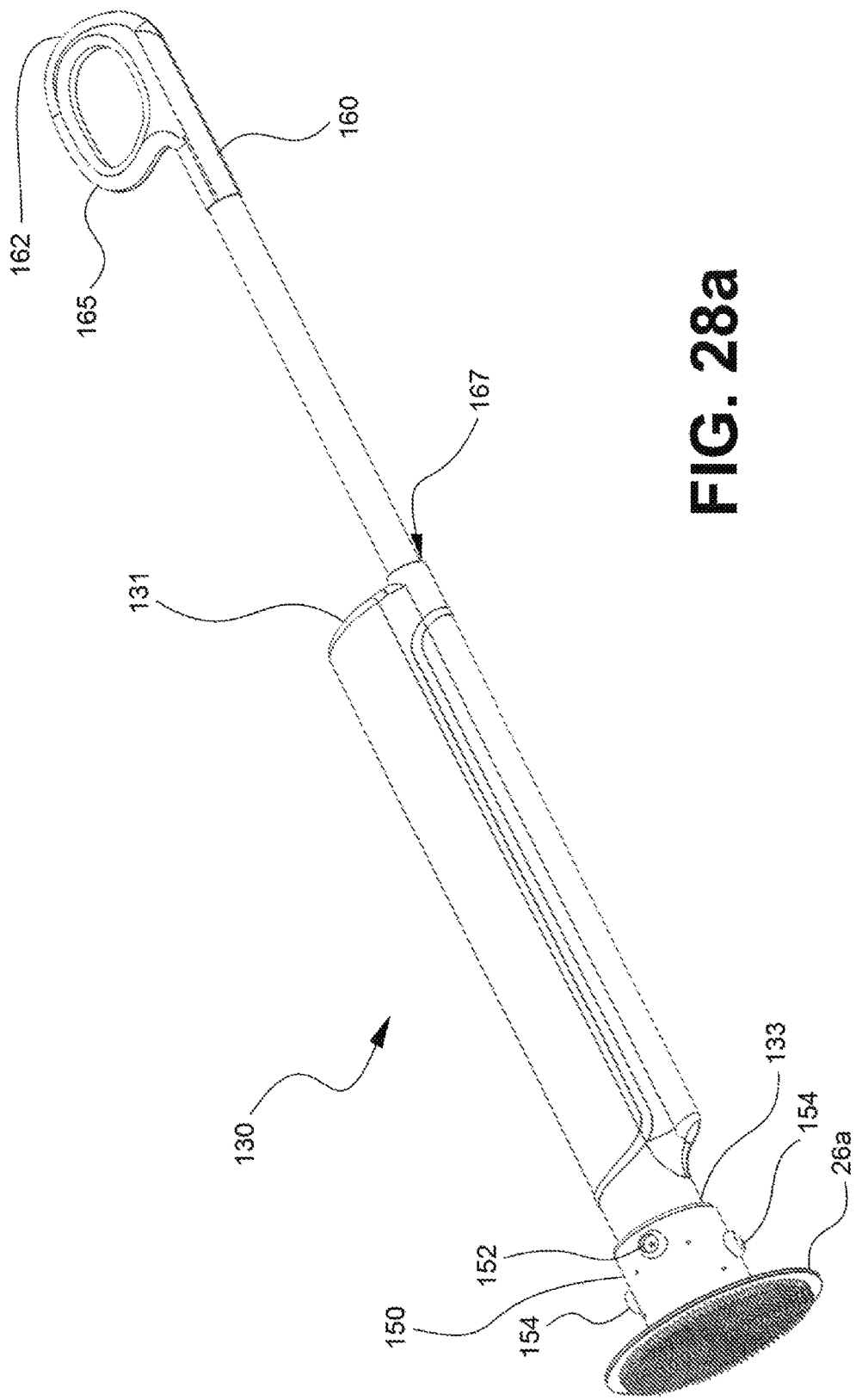

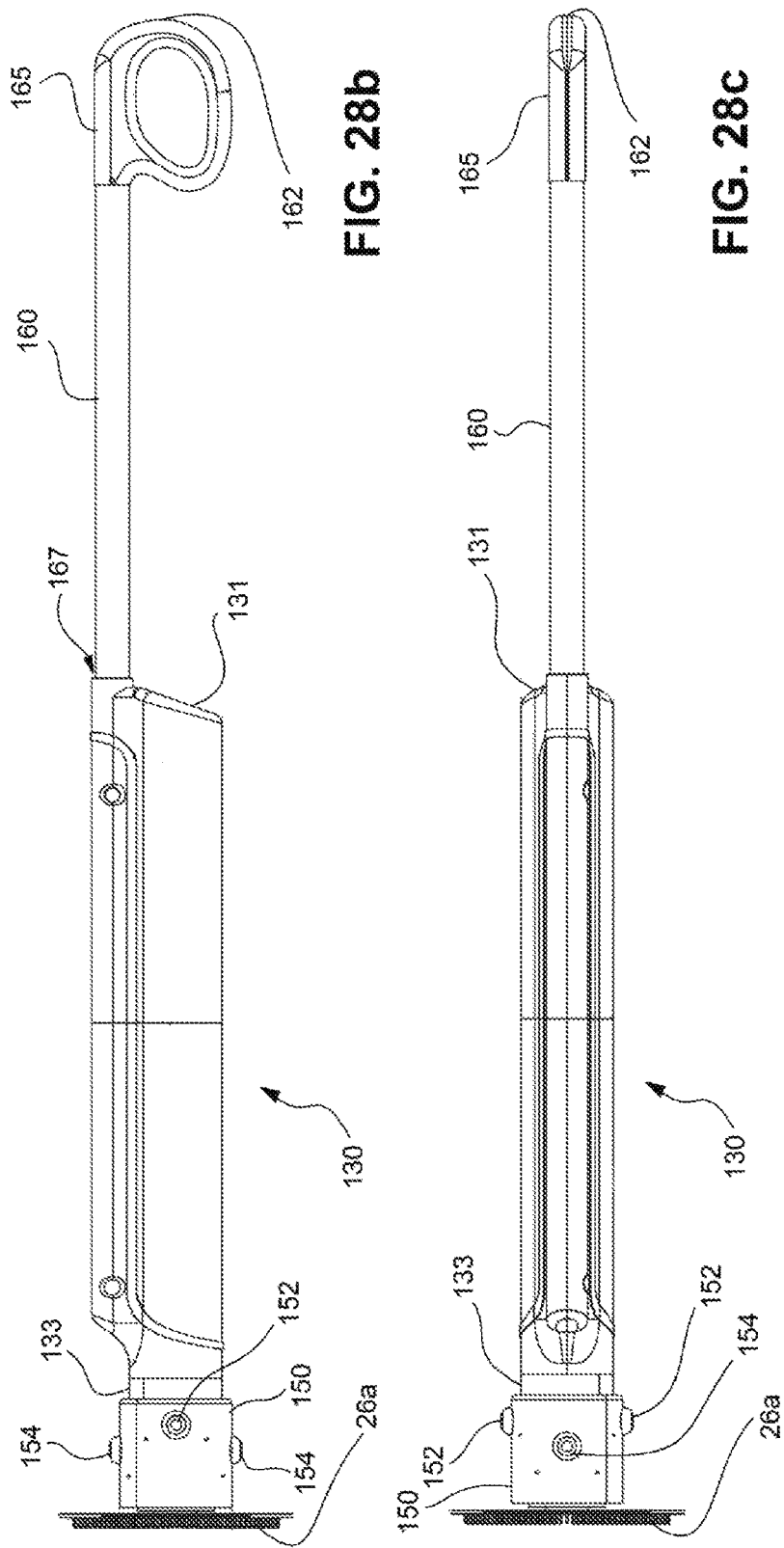

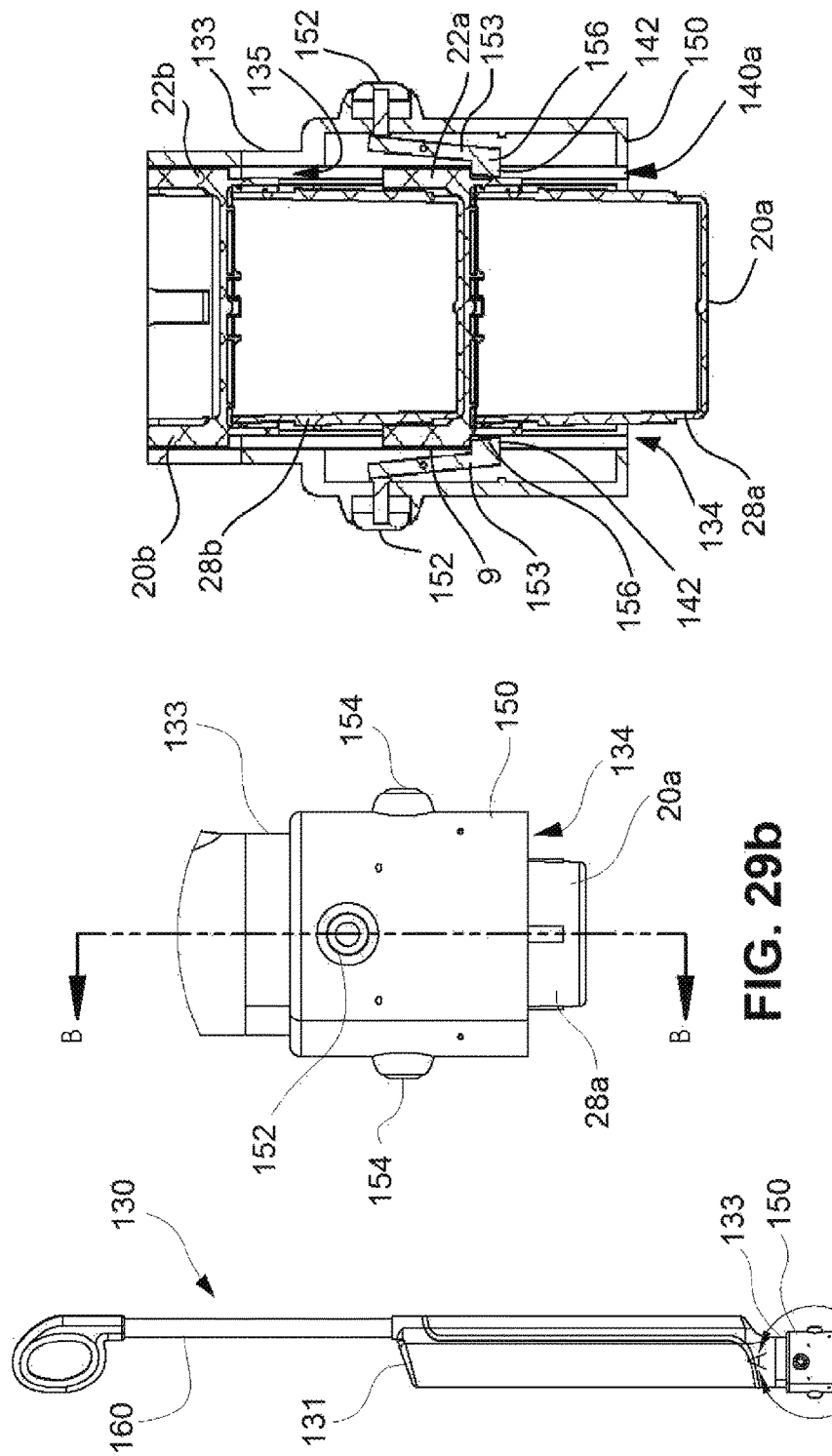

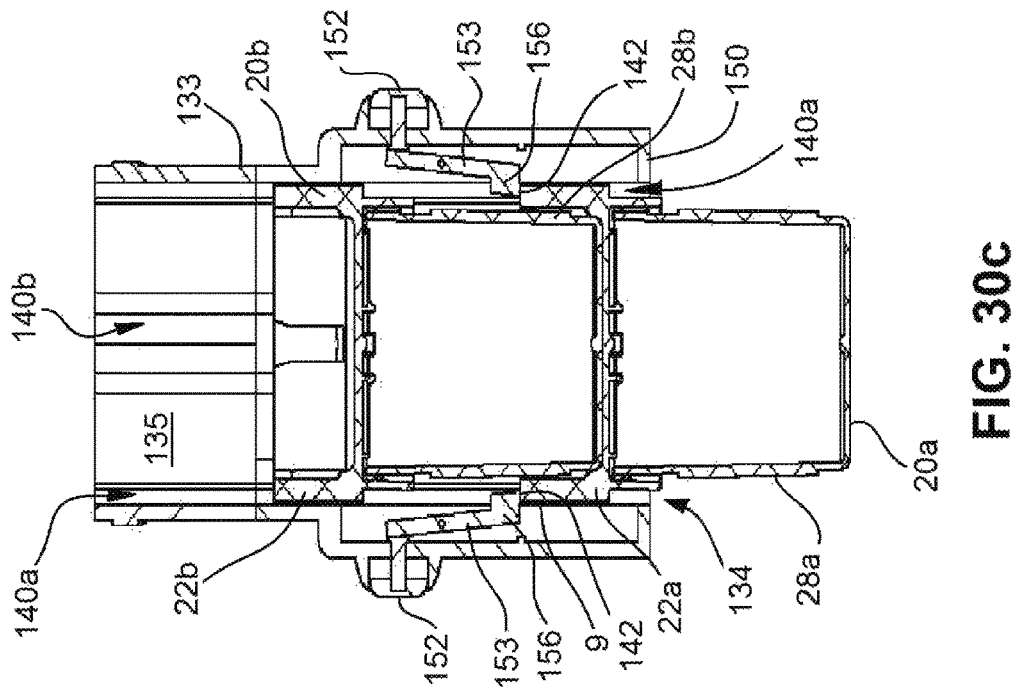
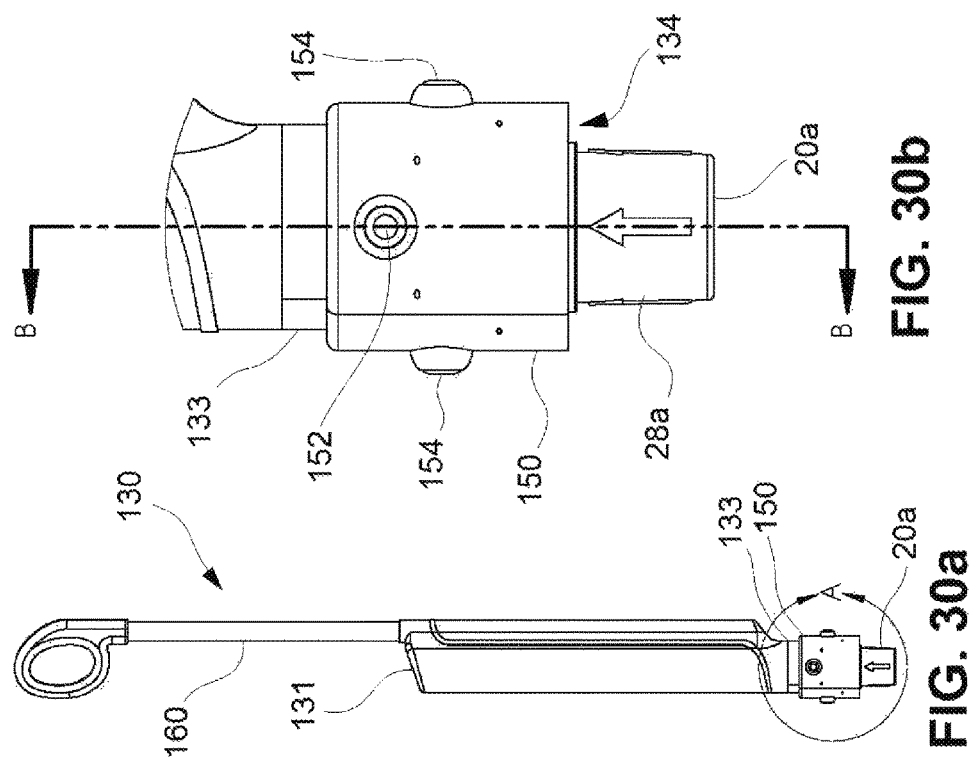

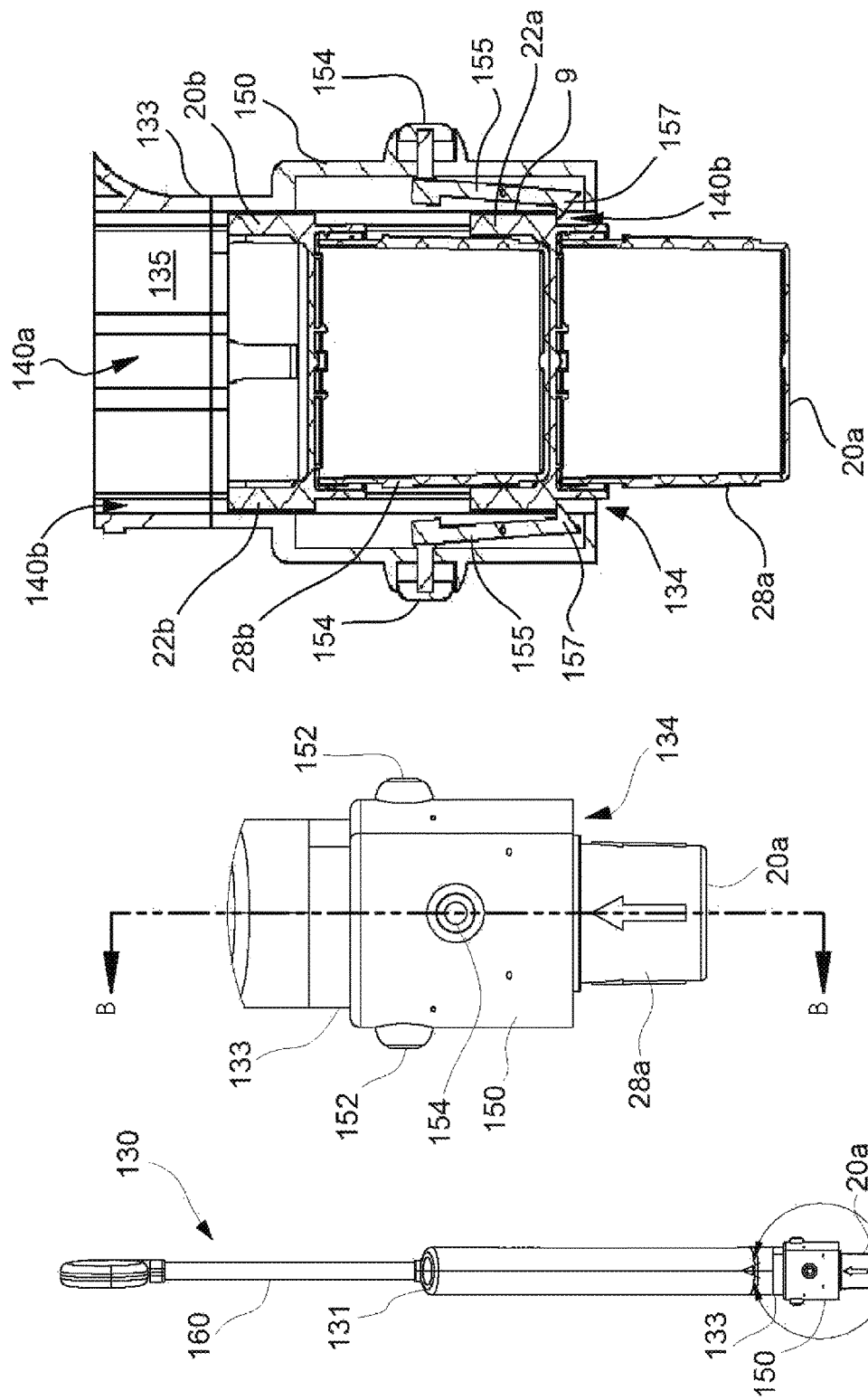

CLEANING CARTRIDGE AND HANDLING UNIT FOR CLEANING SYSTEM

RELATED APPLICATIONS

This application is a 371 U.S. National Stage Application of International Application No. PCT/CA2015/051347, entitled "CLEANING CARTRIDGE AND HANDLING UNIT FOR CLEANING SYSTEM," and filed on Dec. 18, 2015, which claims priority from U.S. Provisional Patent Application No. 62/096,650, entitled "CLEANING DEVICE FOR USE WITH A CLEANING SYSTEM," and filed on Dec. 24, 2014, the entire contents of which are incorporated herein by reference as if set forth in full.

FIELD OF THE INVENTION

The present invention relates to a cleaning cartridge and a handling unit usable in the cleaning system. More specifically, the present invention relates to a cleaning cartridge that provides an expandable cleaning surface that is in a compressed and compacted state prior to use and a handling unit for retaining one or more cleaning cartridges.

BACKGROUND

Mops and brushes are routinely used for cleaning a variety of environments. In particular mops typically have a capacity to absorb liquid, either as an aid to cleaning or to remove unwanted liquid. In use, mop heads become dirty, contaminated and unsanitary and so a variety of disposable mop heads are available which allow the mop head to be discarded without the need for cleaning of the mop head. Many disposable mop heads still require the mop head to be manually removed which may be unpleasant and unsanitary.

There are few cleaning systems which work adequately for airline cabin or airline lavatory cleaning and so cleaning approaches may have to be improvised (for example, using disposable paper towels). If this is done by flight attendants, then this can be an unpleasant and time consuming task. Within the confines of an aircraft, lavatory cleaning may be quite conspicuous to passengers and may create an unfavorable impression of the airline. This may be particularly pronounced if the flight attendant subsequently serves food on board.

Further problems which are particular to aircraft lavatory cleaning include the compact space for both storage and use of a mop or other cleaning system; regulatory requirements that prevent storage of containers of cleaning liquids; and the partial depressurization of the cabin in flight, which can cause liquid containers to leak.

There are a few wringer mop systems which have expandable components as part of the mopping element. These are generally used with either disposable or fixed sponge mop heads and allow the sponge to be folded and compressed against itself during use to aid the draining of liquid held in the sponge. These are generally not configured to maintain a compact shape for space saving during storage, or to load into a cartridge, cassette or dispenser.

Sponge mop heads themselves may be compressed and shrink-wrapped during manufacture to allow space saving during storage, transport and to save retail shelf space. The shrink-wrapping film does not allow significant compression of the sponge. When opened, the sponge lacks structural integrity and rigidity and consequently fails to provide an efficient cleaning surface.

SUMMARY OF THE INVENTION

According to a broad aspect of the present invention, there is provided a cleaning cartridge loadable into and dispensable from a handling unit having a loading mechanism and/or dispensing mechanism, the cleaning cartridge comprising: an outer housing having an inner surface defining a chamber and a mouth providing open access to the chamber; a cap for sealing the outer housing at the mouth; a stiffening component attached to the cap, the stiffening component having a compressed position and an extended position; and a cleaning element attached to the stiffening component, wherein in the compressed position, the stiffening component and cleaning element are compacted to fit into the chamber, and wherein in the extended position, the stiffening component extends to expand the cleaning element to provide a cleaning surface, and the cleaning cartridge having an open position, wherein the stiffening component and cleaning element are disposed in the chamber in the compressed position and the cap is removably attached to the outer housing to seal same at the mouth; and an open position, wherein the cap is detached from the outer housing and the stiffening component is released from the outer housing into the extended position.

According to another broad aspect of the present invention, there is provided a handling unit for storing, activating, dispensing, using, and/or disposing one or more cleaning cartridges, the one or more cleaning cartridges each comprising a cap removably attached to an outer housing, the handling unit comprising: a tubular member having a first end, a second end, a primary channel extending between the first end and second end; an outlet opening at or near the second end providing open access to the primary channel; an outer sleeve positioned at or near the outlet opening, the outer sleeve comprising: an inner surface defining an inner bore, an outer surface, a loading mechanism, and a dispensing mechanism, wherein the loading mechanism, when activated, allows the one or more cleaning cartridges to be loaded into the primary channel via the outlet opening and allows an outermost cleaning cartridge to transition from a storage position to a ready position, and wherein the dispensing mechanism, when activated, disengages and releases the outermost cleaning cartridge.

According to yet another broad aspect of the present invention, there is provided a handling unit for storing, activating, using, and/or disposing a cleaning cartridge having a cap removably attached to an outer housing, the handling unit comprising: a tubular member having a first end and a second end; an outlet opening at or near the second end; an outer sleeve positioned at or near the outlet opening, the outer sleeve comprising: an inner surface defining an inner bore, an outer surface, and a dispensing mechanism, wherein the dispensing mechanism, when activated, allows the cleaning cartridge to be loaded into the inner bore of the outer sleeve via the outlet opening; when deactivated, is configured to retain the cleaning cartridge in a ready position; and, when activated, disengages and releases the cleaning cartridge.

According to another broad aspect of the present invention, there is provided a cleaning system comprising the aforementioned cleaning cartridge and one of the aforementioned handling units.

BRIEF DESCRIPTION OF THE DRAWINGS

Referring to the drawings, several aspects of the present invention are illustrated by way of example, and not by way of limitation, in detail in the figures, wherein:

FIG. 13 is an exploded perspective view of a cleaning cartridge according to one embodiment of the present invention;

FIG. 20 is an exploded perspective view of the cap, the stiffening component, and a cleaning element, in an expanded position, according to one embodiment of the present invention;

FIG. 21 is a cross-sectional view of a cleaning cartridge in the closed position, according to another embodiment of the present invention;

FIGS. 22a, 22b, 22c, and 22d may be collectively referred to herein as FIG. 22;

FIGS. 27a, 27b, and 27c are a side view, a top view, and an end view, respectively, of a handling unit according to another embodiment of the present invention, wherein the handle of the handling unit is in the retracted position. FIGS. 27a and 27b show the alternative handling unit with an outermost cleaning cartridge in the storage position. The alternative handling unit in FIG. 27c is shown without any cleaning cartridges. FIGS. 27a, 27b, and 27c may be collectively referred to herein as FIG. 27;

FIGS. 28a, 28b, and 28c are a perspective view, a side view, and a top view, respectively, of the handling unit of FIG. 27, with the cleaning element of the outermost cleaning cartridge in the expanded position and the handle of the handling unit in the extended position. FIGS. 28a, 28b, and 28c may be collectively referred to herein as FIG. 28;

FIG. 29a is a side view of the handling unit of FIG. 27; FIG. 29b is a magnified view of area "A" in FIG. 29a; and FIG. 29c is a cross-sectional view taken along line B-B of FIG. 29b, with some components inside the cleaning cartridges omitted. FIGS. 29a, 29b, and 29c may be collectively referred to herein as FIG. 29;

FIG. 30a is a side view of the handling unit of FIG. 29, with the outermost cleaning cartridge in the ready position; FIG. 30b is a magnified view of area "A" in FIG. 30a; and FIG. 30c is a cross-sectional view taken along line B-B of FIG. 30b, with some components inside the cleaning cartridges omitted. FIGS. 30a, 30b, and 30c may be collectively referred to herein as FIG. 30; and FIG. 31a is a bottom view of the handling unit of FIG. 30, with the outermost cleaning cartridge in the ready position; FIG. 31b is a magnified view of area "A" in FIG. 31a; and FIG. 31c is a cross-sectional view taken along line B-B of FIG. 31b, with some components inside the cleaning cartridges omitted. FIGS. 31a, 31b, and 31c may be collectively referred to herein as FIG. 31.

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The present invention relates to a cleaning cartridge and a handling unit usable in a cleaning system. The present invention is suitable for use in a variety of environments, particularly those having limited space for storing cleaning equipment and/or small spaces that require cleaning, including for example the interiors of vehicles, airplanes, ships, vessels, homes, etc. For example, applications for the present invention may include the cabin, lavatories and galley areas of airplanes, buses, coaches, recreational vehicles. Due to cleaning regulations, where applicable, and space constraints, the present invention may also be useful for cleaning the floor and working surfaces of ambulances and medical vehicles.

The invention generally relates to a cleaning system comprising a handling unit and one or more cleaning cartridges that can be loaded into the handling unit. Each cartridge comprises an outer housing, a cap attachable to the housing, a stiffening component secured to the cap, and a cleaning element attached to the stiffening component, wherein the stiffening component and the cleaning element can be disposed inside the housing when the stiffening component is in a compressed (storage) position. Upon removal of the cap, the cartridge is in the cleaning position wherein the stiffening component is extended, thereby expanding the cleaning element. The handling unit may be adapted to store, activate, dispense, use and/or dispose of the cleaning cartridges.

Figure 16:
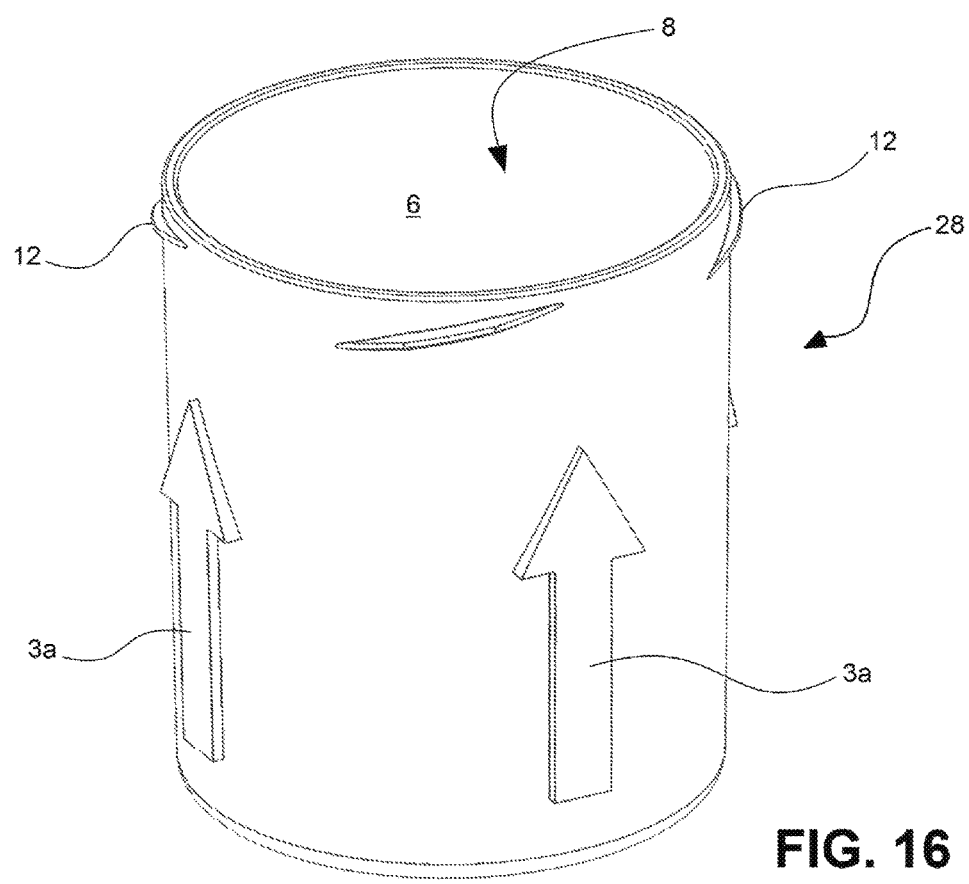
FIG. 16 is a perspective view of an outer housing of the cleaning cartridge according to one embodiment of the present invention.
Figure 17:
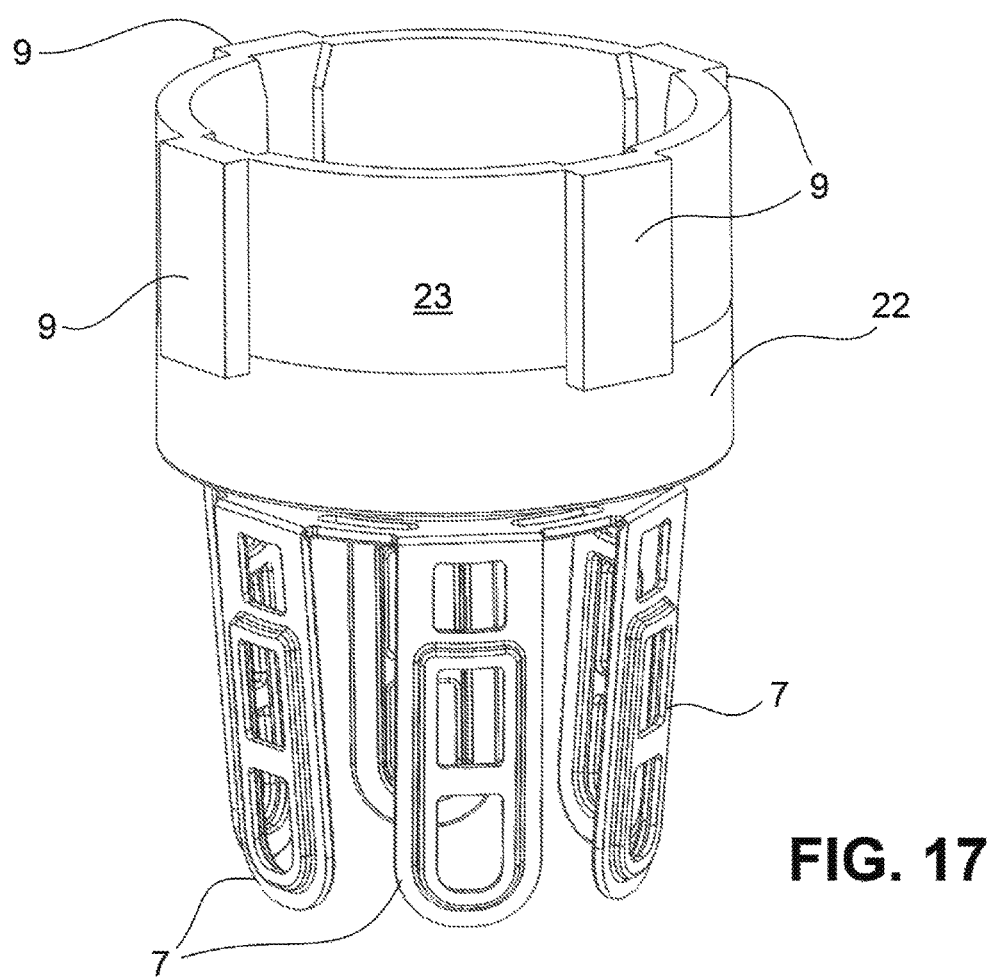
FIG. 17 is a perspective view of a cap of the cleaning cartridge and a stiffening component attached thereto, with the stiffening component in a compressed position, according to one embodiment of the present invention.
Figure 18:
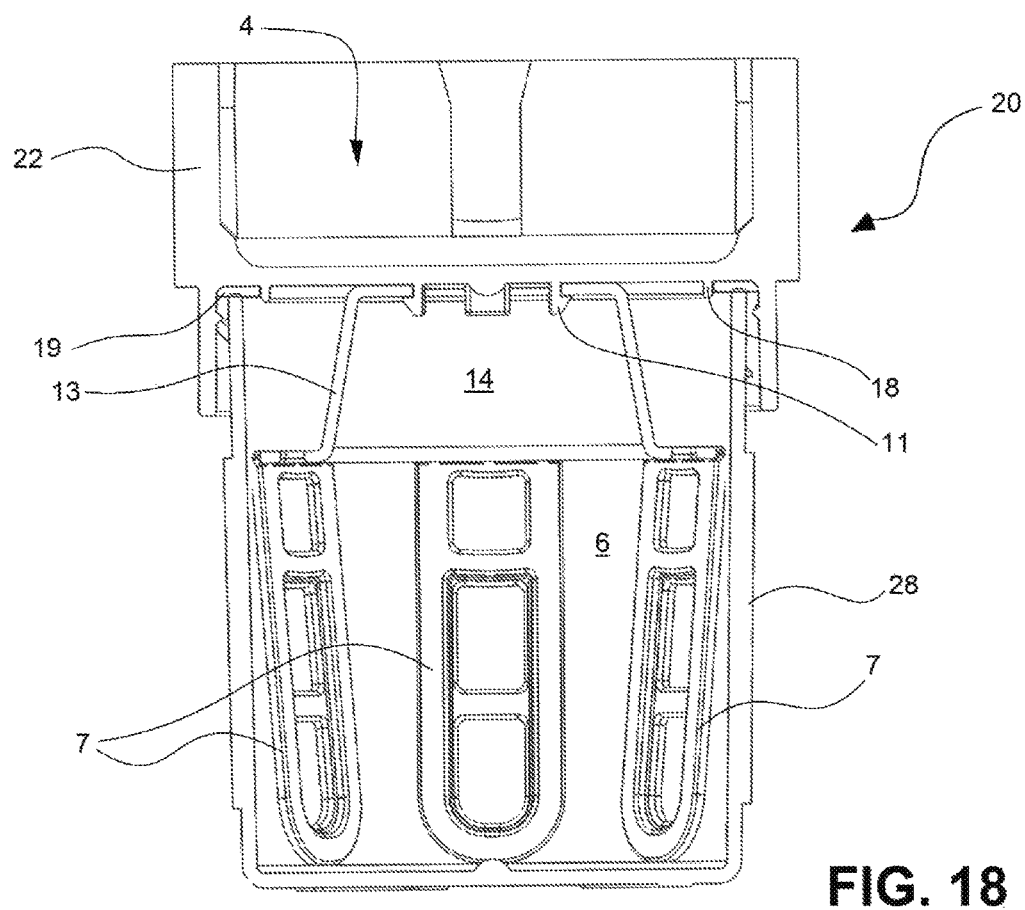
FIG. 18 is a cross-sectional view of the cleaning cartridge in the closed position, according to one embodiment of the present invention.

Turning now to the figures, in which similar reference characters denote similar elements throughout the several views, FIGS. 1 through 20 illustrate a cleaning system 10, which comprises a handling unit 30 and one or more cleaning cartridges 20, each of which comprises an outer housing 28, a cap 22 attachable to the housing, a stiffening component, which in this case is a plurality of collapsible and extendible fingers 7 secured to the cap, and a cleaning element 26 attached to the fingers 7. Housing 28 has an inner surface defining a chamber 6 for receiving the fingers and the cleaning element, and a mouth 8 providing open access to chamber 6. Fingers 7 and cleaning element 26 attached thereto are configured fit inside chamber 6 through mouth 8, when fingers 7 are in a compressed position (as shown in FIGS. 13, 17, and 18). Cap 22 is configured to be attachable to the housing for covering mouth 8 and for securing the fingers and the cleaning element inside the chamber.

Handling unit 30 is adapted to store, activate, dispense, use and/or dispose of the cleaning cartridges 20. In one embodiment, the handling unit 30 includes a nozzle 40 which retains a cleaning cartridge 20 in a position partially extending through an outlet opening 34 awaiting use. The handling unit 30 may include an extendible handle 60 so that it may be converted for use as a mop. The cleaning cartridge and handling unit are described in further detail below.

Cleaning Cartridge

As best shown in FIGS. 13 to 20, the present invention includes a unique cleaning cartridge 20 which stores a stiffening component (e.g. fingers 7) and cleaning element 26 in a compacted state until activation occurs, at which time the fingers 7 are allowed to extend to render cleaning element 26 into a state suitable for cleaning various surfaces. The structure and configuration of the cleaning cartridges 20 may vary and thus should not be construed as being limited by the exemplary figures hereto.

Figure 14B:
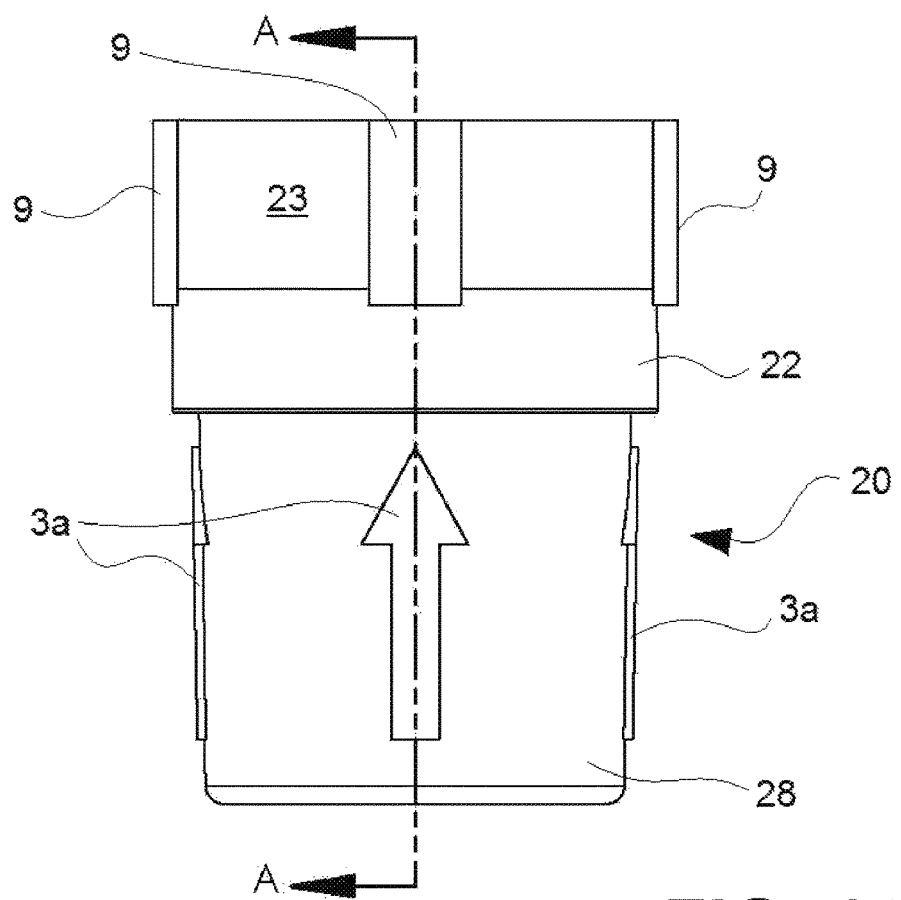
FIG. 14 is a perspective view of the cleaning cartridge of FIG. 13 in a closed position.

As shown in FIGS. 13, 14, and 18, the cleaning cartridge 20 generally comprises a cap 22, a plurality of collapsible and extendible fingers 7 secured to the cap 22, a cleaning element 26 (shown only in FIG. 20) attached to fingers 7, and an outer housing 28 having an inner surface defining a chamber 6 for receiving fingers 7 and cleaning element 26 therein and an mouth 8 for providing open access to chamber 6 and for allowing the passage of fingers 7 and cleaning element 26 therethrough. The fingers are configured to fit into the chamber of the housing when in the compressed position. Cap 22 is configured to be removably securable to housing 28 for covering mouth 8 and for securing fingers 7 and cleaning element 26 inside the chamber.

Figure 15:
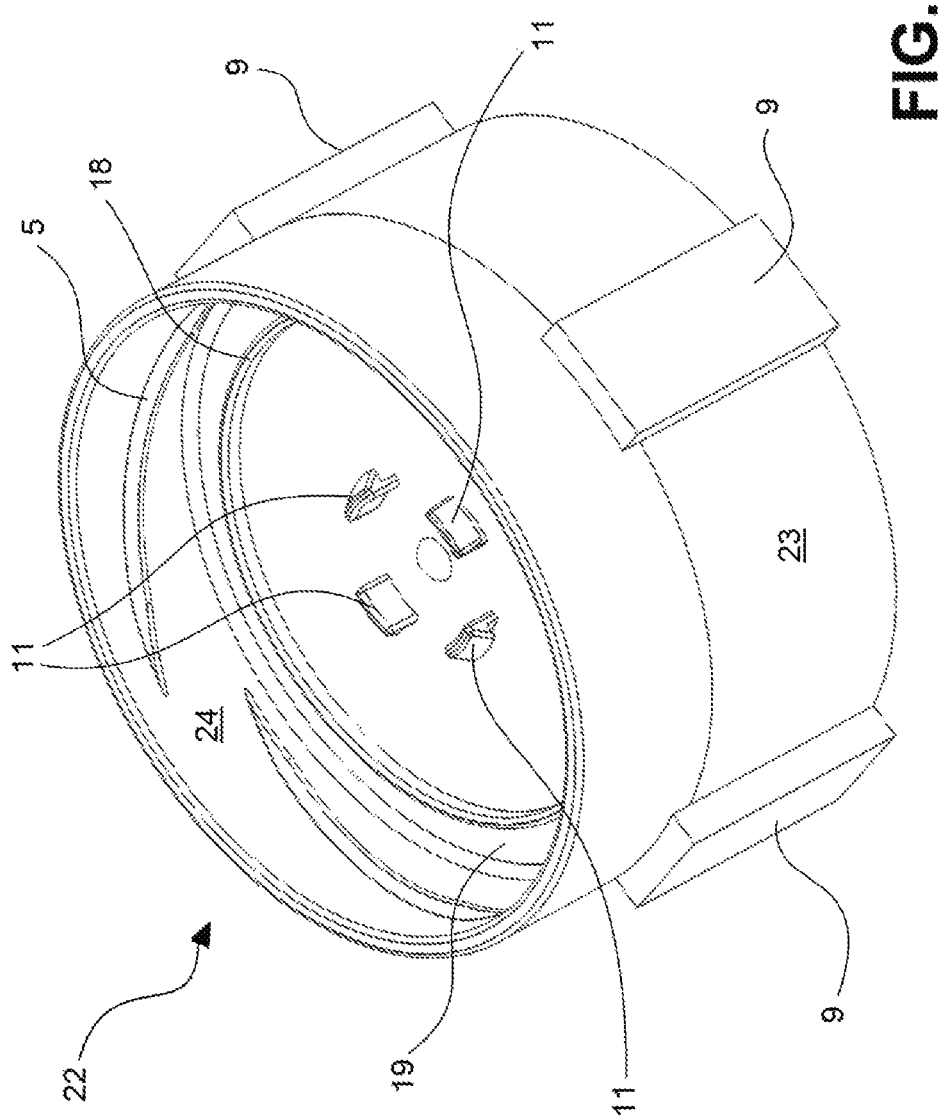
FIG. 15 is a perspective view of one side of a cap of the cleaning cartridge according to one embodiment of the present invention.

With reference to FIGS. 13 to 15, the cap 22 may be comprised of various structures, but will preferably be comprised of a rigid, round cap-like structure to which the fingers 7 are fixedly secured. The cap 22 generally includes an outer surface 23 and an inner surface 24. The outer surface 23 of the cap 22 is adapted to be engageable by the handling unit of the present invention. In an alternative embodiment, the outer surface 23 includes raised tabs 9 that extend radially outwardly therefrom. Tabs 9 are preferably intermittently placed around the circumference of outer surface 23 such that adjacent tabs are separated radially. The function of tabs 9 will be discussed in detail subsequently hereinbelow.

The cleaning cartridge has a closed position, wherein the fingers are disposed in chamber 6 and wherein the fingers are compressed by the inner surface of housing 28 into the compressed position, thereby compacting cleaning element 26 therebetween, and cap 22 is removably attached to housing 28, covering mouth 8 and securing the fingers and cleaning element in the chamber. The fingers are held in the compressed position within the chamber by the housing's inner surface and are configured to extend radially outwardly into an extended position when released from the housing (i.e. when housing 28 is removed from cap 22). Preferably, fingers 7 are biased or spring-biased towards the extended position when the housing is removed from the cap. When fingers 7 are released from the housing, the cleaning cartridge is in an open (or operational) position as shown for example in FIGS. 19 and 20.

Figure 19:
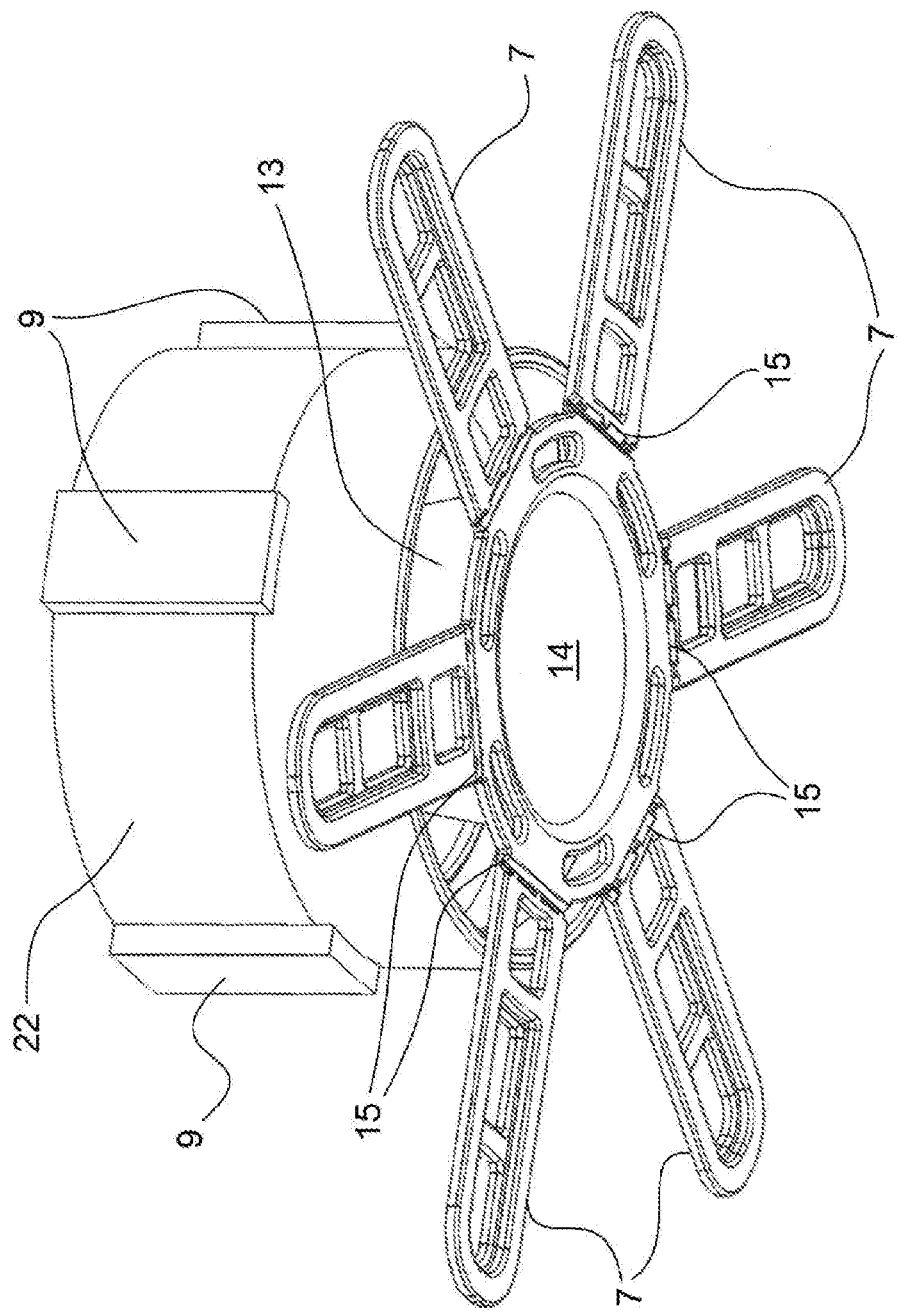
FIG. 19 is a perspective view of the cap and the stiffening component attached thereto, with the stiffening component in an extended position, according to one embodiment of the present invention.
Figure 22A:
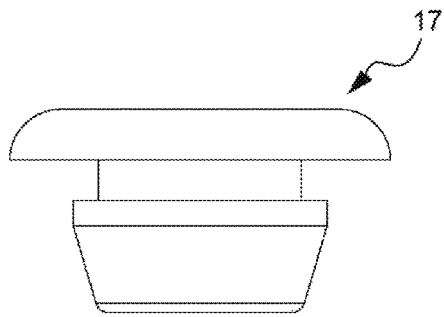
FIGS. 22a, 22b, 22c, and 22d are a side view, a perspective view, a top view, and a cross-sectional view, respectively, of a membrane for use with the cap of the cleaning cartridge, according to one embodiment of the present invention.
Figure 22B:
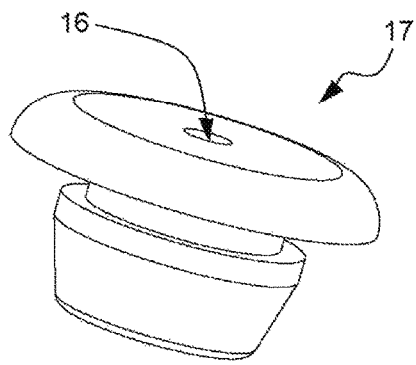
Figure 22C:
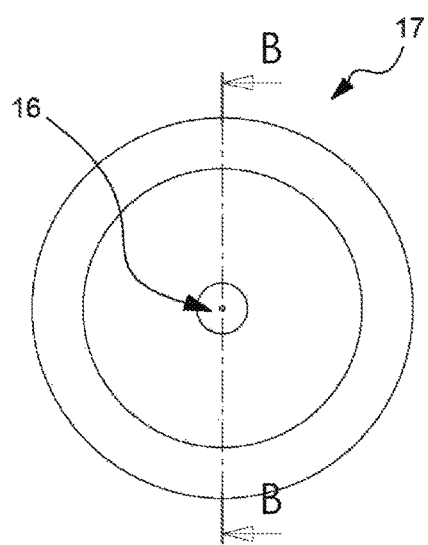
Figure 22D:
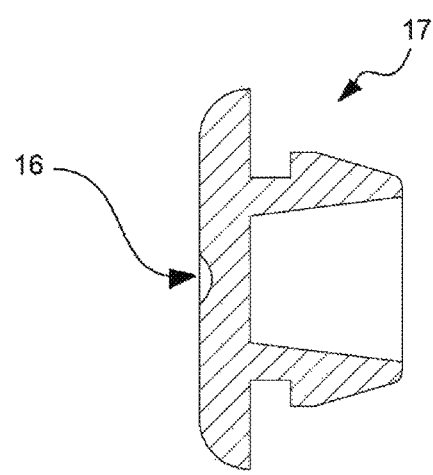

While fingers 7 are shown as fully extended in FIGS. 19 and 20, the fingers may not be extended or may only be partially extended when the cleaning cartridge is in the open position. In the extended position, the fingers may collectively provide a substantially planar frame for the cleaning element. Alternatively, the fingers may be extended to define a substantially planar frame for the cleaning element when pressed against a substantially flat surface. Optionally, the cleaning cartridge may include a mechanism for locking the fingers into place after they are extended.

The fingers 7 serve as a structural frame to provide some rigidity for the cleaning element 26. Therefore, fingers 7 are preferably made of a material with some stiffness to provide structural integrity to the cleaning element when expanded.

The fingers 7 are fixedly secured to the inner surface 24 of the cap 22 as shown throughout the figures. Various methods and devices may be used to secure the fingers 7 to the cap 22, such as an adhesive. In alternate embodiments, the fingers 7 may be secured to the inner surface 24 of the cap 22 via such methods as friction fitting, frictional resistance, ultrasonic welding, or various other methods known in the art to fixedly secure one object to another. The fingers 7 are preferably fixedly secured to the inner surface 24 of the cap 22 in such a manner as not to become partially or fully dislodged as the cleaning element 26 is being drawn across various surfaces for cleaning.

According to a sample embodiment, and with reference to FIGS. 13, 15, and 18, fingers 7 are connected to one another by a central hub 13. For example, as shown in FIG. 19, the fingers may each be connected to the hub 13 by a spring loaded hinge 15. Cap 22 includes hooks 11 for engaging hub 13 to secure fingers 7 to cap 22. In a sample embodiment, hub 13 has an opening for receiving hooks 11 such that hub 13 can be attached to the cap by hooking hooks 11 on to the inner edge of the hub's opening. Preferably, hooks 11 have some elasticity to allow them to be slightly compressed to fit through the hub's opening and then snap into place (i.e. hook on to the inner edge of the opening) once they are past the opening, thereby securing hub 13 to cap 22.

In one embodiment, the cleaning cartridge is configured to store cleaning fluids therein. For example, as shown in FIGS. 18 and 19, hub 13 has an inner surface defining a chamber 14 for storing a volume of cleaning fluid. In an alternative embodiment, the cap may include a foil seal glued to the rim of the cap's mouth, thereby sealing in any fluids and the fingers along with the cleaning element inside housing 28.

Cap 22 is securable to housing 28 to help seal the cleaning cartridge to hold cleaning fluid therein and keep the fingers (along with the cleaning element) inside the housing until the cap is removed from the housing. There are many ways cap 22 may be secured to housing 28. For example, as shown in FIGS. 13, 15, and 16, cap 22 includes threads 5 and housing 28 includes threads 12 near its mouth such that cap 22 can be threadedly connected to housing 28.

In an additional or alternative embodiment, with reference to FIGS. 21 and 22, cap 22 may include a membrane 17 that can be penetrated by force, for example shear force. When cap 22 is attached to housing 28 and membrane 17 is intact, the cap and the membrane 17 restrict fluid flow into and out of housing 28. When the membrane 17 is penetrated, fluid can flow into the housing via the opening in the membrane. Membrane 17 may be configured such that, when penetrated, it allows fluid to flow one way (i.e. into the housing) and restricts and/or reduces fluid flow in the opposite direction (i.e. out of the housing). In an embodiment where hub 13 is present, penetration of membrane 17 allows external fluid to enter chamber 14 of the hub via the opening in the membrane. Where hub 13 is omitted, penetration of membrane 17 allows external fluid to directly enter chamber 6 via the opening in the membrane. Preferably, when membrane 17 is penetrated and fluid is introduced into housing 28, at least a portion of the fluid comes into contact with the cleaning element 26.

Membrane 17 is preferably made of an elastic material that can be penetrated by, for example, a sharp object such as a needle or other types of injection tip. Preferably, the sharp object has a small cross-section in order to minimize the size of the opening in the membrane, which may help minimize any leakage from the housing after the sharp object is removed.

In a sample embodiment, membrane 17 may be a plastic plug configured to fit into an opening in the cap 22 that provides open access to the opening in the hub 13, or to the chamber 6 if hub 13 is omitted. In one embodiment, the opening in cap 22 is positioned between hooks 11. Membrane 17 may have an area where the membrane material is thinner and/or weakened to facilitate penetration. Further membrane 17 may include an indicium, such as a dimple 16 (shown in FIG. 22), to indicate the location of the area where the membrane is thinner and/or weakened.

By including membrane 17, the cleaning cartridge 20 may be manufactured and transported empty (i.e. without any liquid inside), thereby reducing the weight of the cartridge, which may help reduce the cost of transporting same. A volume of cleaning fluid may be subsequently injected into the cleaning cartridge via membrane 17, for example, by penetrating the membrane with an injection tip in fluid communication with a cleaning fluid source. For example, the injection tip may be a needle and the cleaning fluid source may be a syringe containing the cleaning fluid. The type of cleaning fluid to be injected into the cleaning cartridge may be selected to suit the surface to be cleaned. For example, a cleaning solution for hardwood floors may have a different composition than that of a cleaning solution for bathroom tiles. As such, in addition to potentially reducing transportation costs, an advantage of allowing cleaning fluid to be injected via membrane 17 subsequent to the manufacturing of the cartridge is that a person downstream from the manufacturer (e.g. distributor, retailer, end user, etc.) can select the type of cleaning fluid to inject into the cartridge depending on the intended cleaning surface.

In a sample embodiment, with reference to FIGS. 13 to 16, the outer surface of outer housing 28 may include indicia 3a to indicate to a user the direction cleaning cartridge 20 is to be loaded into handling unit 30. In an alternative or additional embodiment, the outer surface of outer housing 28 may include indicia 3b to indicate to a user the direction to turn housing 28 to remove same from cap 22.

The outer housing 28 may be comprised of a rigid container or, in some embodiments, may be comprised of a flexible or semi-rigid structure surrounding the compressed fingers and cleaning element. Preferably, the outer housing 28 fully seals the fingers and cleaning element therein to prevent leakage of any cleaning solution included therewith.

A wide range of materials may be used for the cleaning element 26, so long as they may be compressed between the fingers and within the outer housing 28 prior to use and expanded upon removal of the outer housing 28. Further, the cleaning element is preferably made of an absorbent cleaning material. By way of example and without limitation, the cleaning element 26 may be made of microfiber, and may be for example a pad, sponge, or cloth. The cleaning element may comprise a single sheet of material or several sheets of material. For example, cleaning element 26 may be a pad with nodules and/or a microfiber surface. Cleaning element 26 may be fully or partially textured to provide a cleaning surface capable of removing stains from other surfaces without excess scrubbing.

For example, the cap and/or housing may be made of polypropylene or polyethylene and/or may be manufactured by injection molding. Of course, the cap and/or housing may be made of other suitable materials and by other manufacturing processes.

In a sample embodiment, the cleaning element is a single sheet of material attached to the fingers that extend between the fingers when the fingers are in the extended position. In the extended position, the fingers spread out the cleaning element to provide a cleaning surface. The cleaning surface may be of any planar shape, including for example triangular, square, rectangular, pentagonal, hexagonal, etc. Alternatively, the cleaning element comprises multiple sheets of material that are attached piecewise to each finger, and the resulting cleaning surface may be roughly star-shaped.

In some embodiments, the cleaning element 26 may be retained in a dried state. In other embodiments, the cleaning element 26 may be stored within the cleaning cartridge 20 with a cleaning solution to aid in cleaning various surfaces upon opening of the cartridge 20.

With reference to FIGS. 15, 18, and 20, a seal 19 may be included in cap 22 to help keep the cleaning cartridge fluid tight when the cap is attached to the housing to prevent leakage and/or evaporation of any fluids (e.g. the cleaning fluid). Optionally, cap 22 may also include a locating ring 18 for ease of placement of seal 19. For example, seal 19 is shaped and sized for placement outside the circumference of the locating ring, but inside the inner rim of the cap. In one embodiment, the seal is made of thermoplastic vulcanizate or thermoplastic elastomers, and it is manufactured by injection molding. Of course, the seal may be made of other suitable materials and by other manufacturing processes.

In one embodiment, with reference to FIG. 20, the cleaning cartridge further comprises a covering 21 for the cleaning element. The covering 21 helps secure the cleaning element to the fingers. For example, the cleaning element may be sewn to the covering 21 with the fingers in the expanded position disposed therebetween. When the fingers are retracted in the compressed position, the fingers and the cleaning element attached thereto fit into housing 28.

Figure 23:
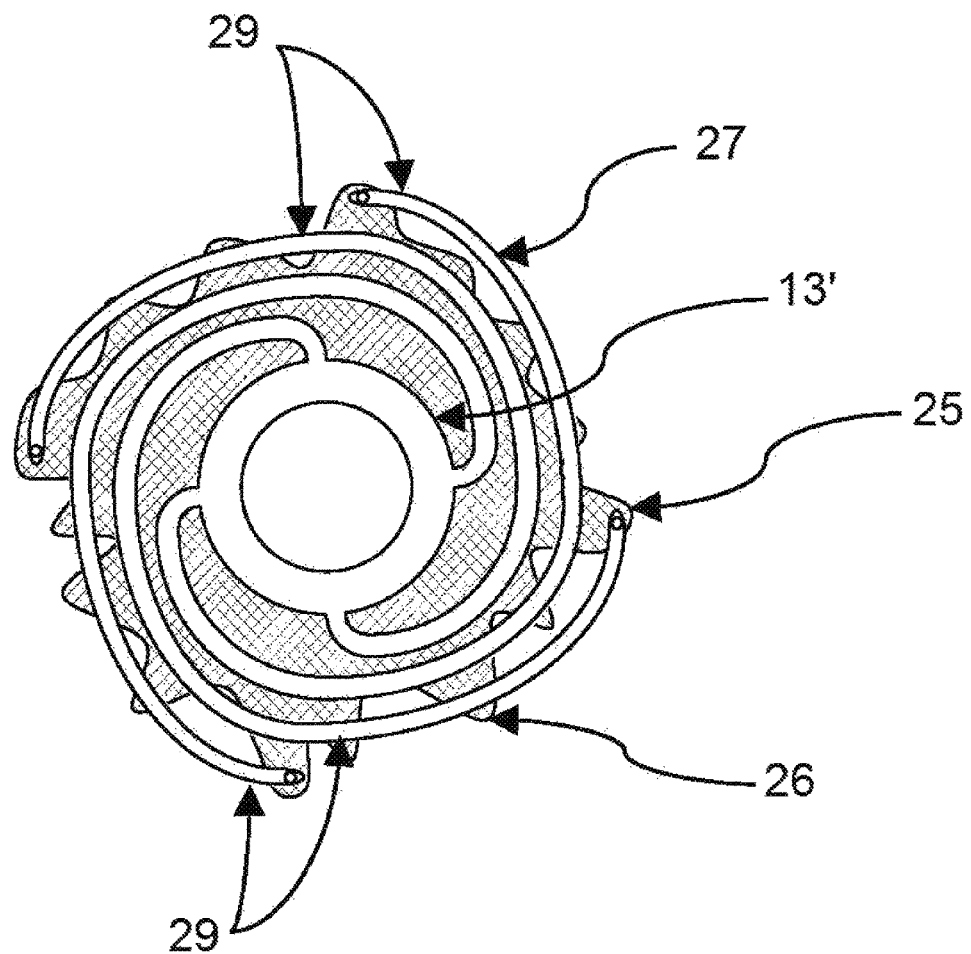
FIG. 23 is a top view of a stiffening component having a cleaning element attached thereto, according to another embodiment of the invention, wherein the stiffening component is in a compact position.
Figure 24:
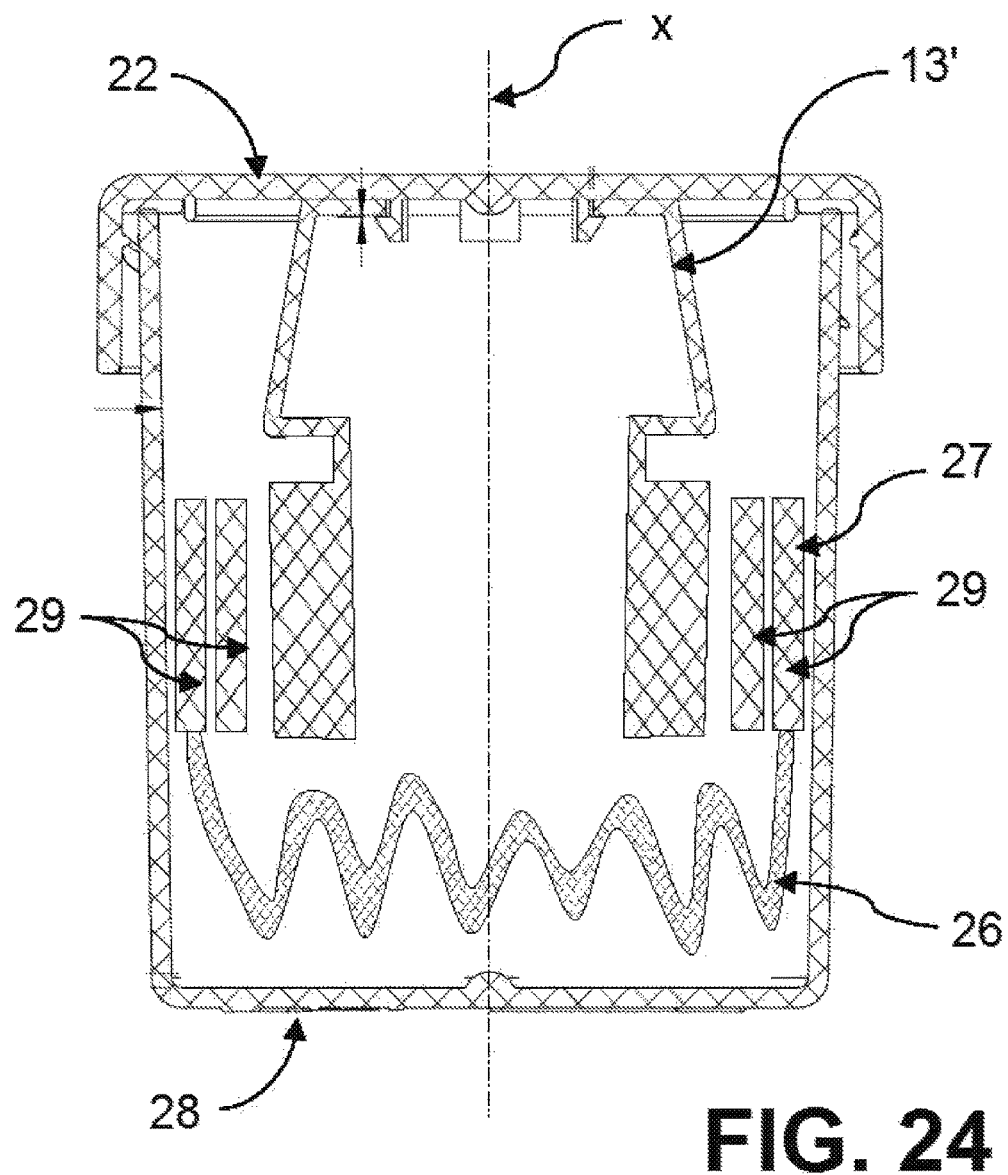
FIG. 24 is a cross-sectional view of a cleaning cartridge having the stiffening component shown in FIG. 23.
Figure 25:
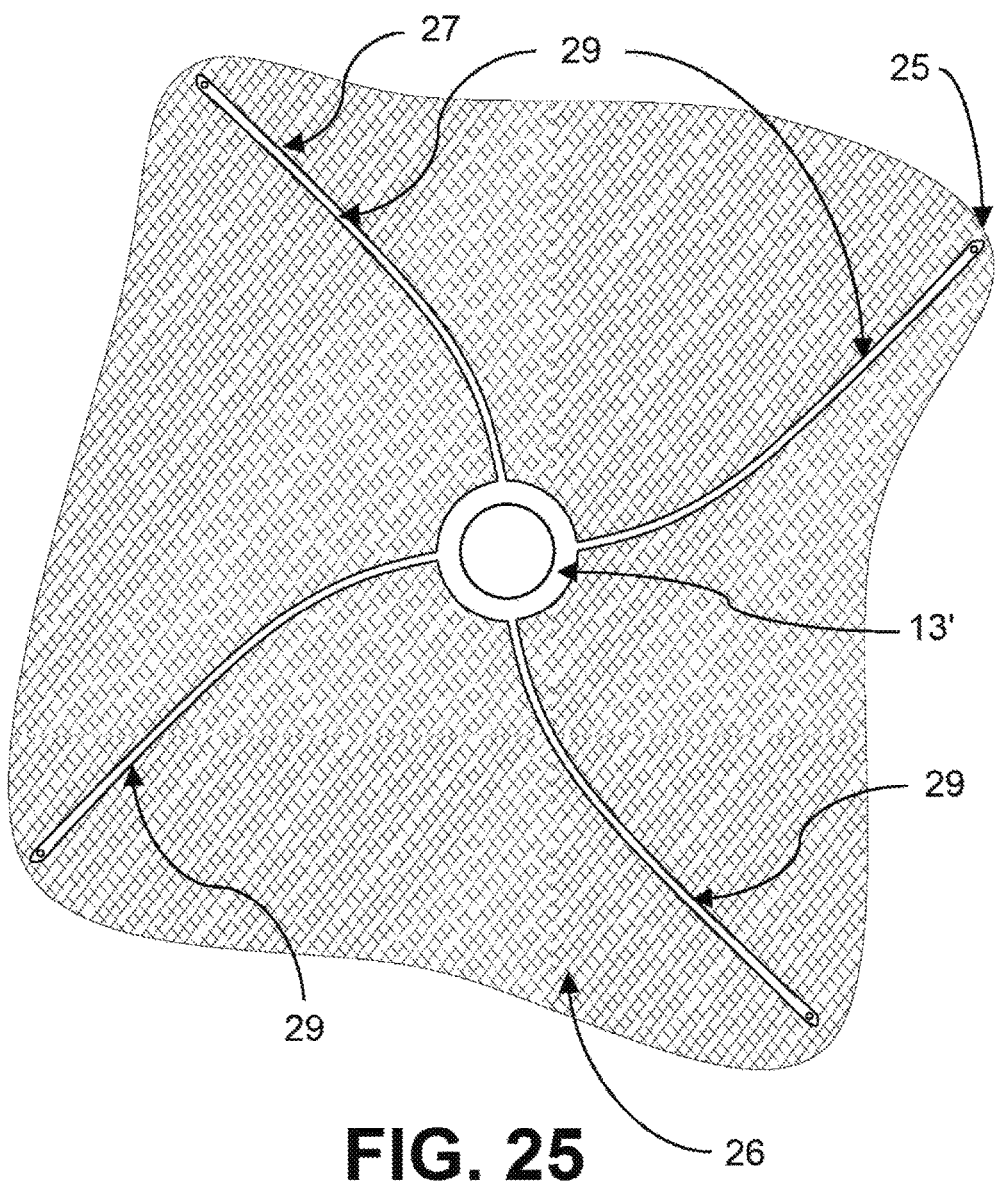
FIG. 25 is a top view of the stiffening component shown in FIG. 23 in an expanded position.

In an alternative embodiment, with reference to FIGS. 23 to 25, the stiffening component of the cleaning cartridge may be a hoop 27 that is stored in the housing in a coiled position (referred to as the "compressed position"). Preferably, hoop 27 is made of a material with some stiffness to provide the cleaning element with some structural integrity when pressed against a surface while the hoop is in an expanded position.

In a sample embodiment, hoop 27 comprises one or more veins 29 extending radially outwardly from a hub 13'. In the compressed position, the veins are coiled around the hub about a central axis x thereof, as shown for example in FIGS. 23 and 24, and, in the expanded position, the veins are (at least partially) uncoiled and extend away from the hub, as shown for example in FIG. 25. The veins may be made of various elastic, flexible materials, including for example plastic. Preferably, the width of vein 29 (as measured in a plane substantially orthogonal to axis x) is smaller than its height (as measured on a plane substantially parallel to axis x. The narrower width of vein 29 may provide the hoop with more flexibility for compact storage and for ready uncoiling when released from housing 28. The greater height profile may provide the hoop with more stiffness and resistance to bending in the expanded position, which may allow a user to exert more downward pressure thereon when scrubbing the cleaning element on a surface.

In one embodiment, the cleaning element 26 is attached to the hoop 27 by one or more fixture points 25. For sample, fixture points 25 are located at or near the free ends of veins 29, such that when the veins uncoil from the hub when released from housing 28, the cleaning element is expanded to provide a cleaning surface. The fixture points may be a clip, a pin, an adhesive, etc.

Preferably, cleaning element 26 is sized such that when hoop 27 is in the expanded position, the cleaning element is slightly under tension, which may help provide a more resilient and even cleaning surface.

The stiffening component of the cleaning cartridge may be made of a variety of materials, including for example plastic (e.g. polypropylene or polyethylene), metal, memory foam, etc., or a combination thereof. The stiffening component may be manufactured by injection molding.

In a sample embodiment, housing 28 is a cylindrical container having a diameter of about 1.7" and a height of about 2". Further, cap 22 is substantially cylindrical with a diameter of about 1.97 inches and a height of about 0.5". Preferably, housing 28 has a slightly larger diameter at the mouth than at its closed end. In other words, housing 28 may be slightly tapered towards its closed end. In another embodiment, the diameter of housing 28 ranges from 1" to 4" and its length may also range from 1" to 4". Housing 28 may also have other configurations. Of course, the size and configuration of cap 22 depends on the size and configuration of housing 28.

In another sample embodiment, fingers 7 when extended are each about 1.42" long and about 0.5" wide. Further, in the extended position, the span from the free end of one finger to the free end of the opposite finger is about 4.3".

In one embodiment, chamber 14 is about 0.6" deep and tapers from the open end to the closed end (attached to cap 22) from about 1.13" to about 0.94".

In an optional embodiment, chamber 14 may be sealed by a seal such as a foil or film cover, and the seal is torn or pierced when the housing and the cap are separated, or is pierced by a sharp object inside the cap when the cleaning element in the expanded position is pressed against a surface.

The cleaning cartridge may contain specialized cleaning solutions and/or specialized cleaning elements, for example, for hardwood surfaces, tile surfaces, dry sweeping, absorbing spilled liquids, etc. As discussed above, the cleaning solution may be added to the cartridge post-manufacturing.

Optionally, the stiffening component is configured such that it cannot readily be refolded and returned to the housing, thereby preventing reuse of the cleaning device to ensure hygiene. In another optional embodiment for use, for example, for home use, the cleaning element can be washed and returned to the compact position for reuse. Optionally, the materials of the cleaning cartridge and/or the cleaning element may be recyclable and/or biodegradable.

To manufacture the cleaning device, the stiffening component and cleaning element are assembled and attached to the cap. Then, the stiffening component is compressed and loaded into the housing, along with the cleaning element. The cap is fastened to the mouth of the housing to seal same. Fluids may be added to the housing and/or chamber before the cleaning cartridge is sealed and/or afterwards, as discussed above.

In a further embodiment, where the stiffening component is veins, pressing the expanded cleaning element against a surface to be cleaned and rotating same may produce a twisting effect on the cleaning element, which may help fully uncoil the veins from the hub.

The cleaning device allows a cleaning element and cleaning fluids to be stored in a compact single unit, thereby reducing the need for additional accessories and/or cleaning fluids.

Figure 26:
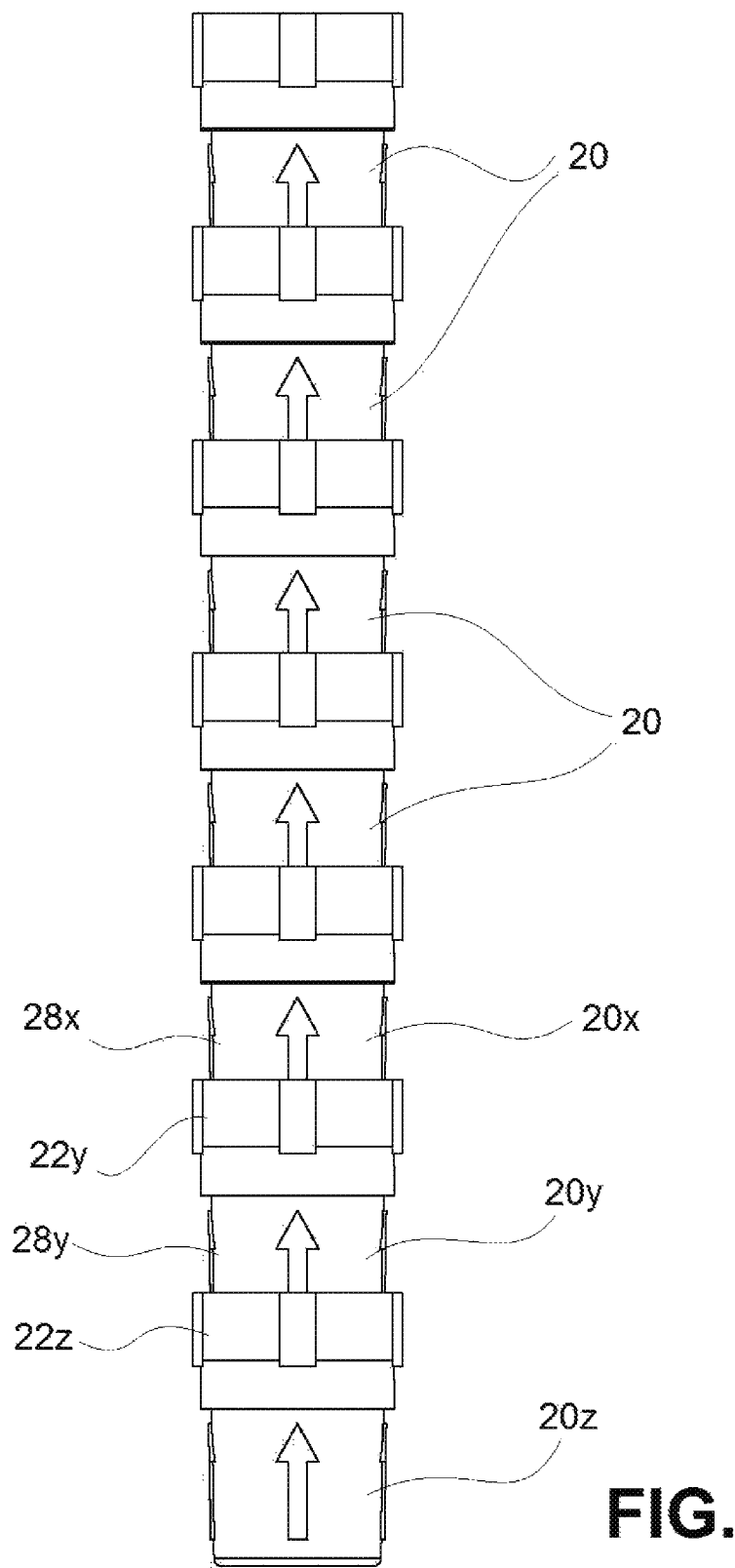
FIG. 26 is a side view of a plurality of nested cleaning cartridges, according to one embodiment of the present invention.

In one embodiment, with reference to FIGS. 14 and 26, a cleaning cartridge 20z has a cap 22z which includes a recess 4 for receiving a portion of outer housing 28y of another cleaning cartridge 20y, such that cleaning cartridge 20y can be stacked on the cap 22z of cleaning cartridge 20z in a substantially coaxial manner. The cap 22y of cartridge 20 y has a recess 4 for receiving a portion of outer housing 28x of another cleaning cartridge 20x such that cleaning cartridge 20x can be stacked on the cap 22y, and so on. By providing a recess 4 in the cap 22 and configuring same to receive a portion of outer housing 28 of another cartridge, a plurality of cleaning cartridges can be stacked in a substantially coaxial and nested arrangement (as shown for example in FIG. 26), which may help the cartridges align with one another while being loaded into handling unit 30 and/or maintain the alignment inside handling unit 30. The stackability of the cleaning cartridges may also facilitate post-manufacturing storage and transportation of same.

Top Loading Handling Unit

The cleaning system 10 may include a handling unit 30 which stores, activates, and/or dispenses the cleaning cartridges 20 of the present invention. As best shown in FIGS. 1 to 12, the handling unit 30 comprises a substantially tubular member having a first end 31 and a second end 33. A channel 35 runs through the handling unit 30 between its first and second ends 31, 33. The handling unit 30 may include a first bracket 38 and a second bracket 39 for securing an extendible handle 60 to the handling unit 30 as shown in the figures and discussed herein. In one embodiment, the extendible handle comprises a telescoping mechanism to allow the handle to extend and retract as desired. In some embodiments, the handling unit 30 may include an attached light and/or bottle (not shown).

In one embodiment, the first end 31 of the handling unit 30 includes an inlet opening 32 through which cleaning cartridges 20 may be inserted into the channel 35. The second end 33 of the handling unit 30 includes an outlet opening 34 through which the cleaning cartridges 20 are activated for use and dispensed after use. In an alternative or additional embodiment, which is described in more detail below, cleaning cartridges 20 may be loaded into the channel 35 from second end 33 at outlet opening 34, through which the cartridges can be activated for use and dispensed after use. Whether loaded from first end 31 or second end 33, the cleaning cartridge 20a that is located at outlet opening 34 (the "outermost cleaning cartridge") preferably partially extends out of the outlet opening 34 of the handling unit 30 prior to activation.

In one embodiment, as shown in FIGS. 1 to 12, where cartridges 20 are loaded from first end 31, a hinged connector 36 is secured adjacent the first end 31 of the handling unit 30 and includes a hinged cap 37 which selectively opens and closes the inlet opening 32 so that cleaning cartridges 20 may be inserted into the channel 35 therethrough. A nozzle 40 and outer sleeve 50 are positioned at the outlet opening 34 for activating and dispensing the outermost cleaning cartridge 20a as discussed below.

i. Nozzle

Figure 3:
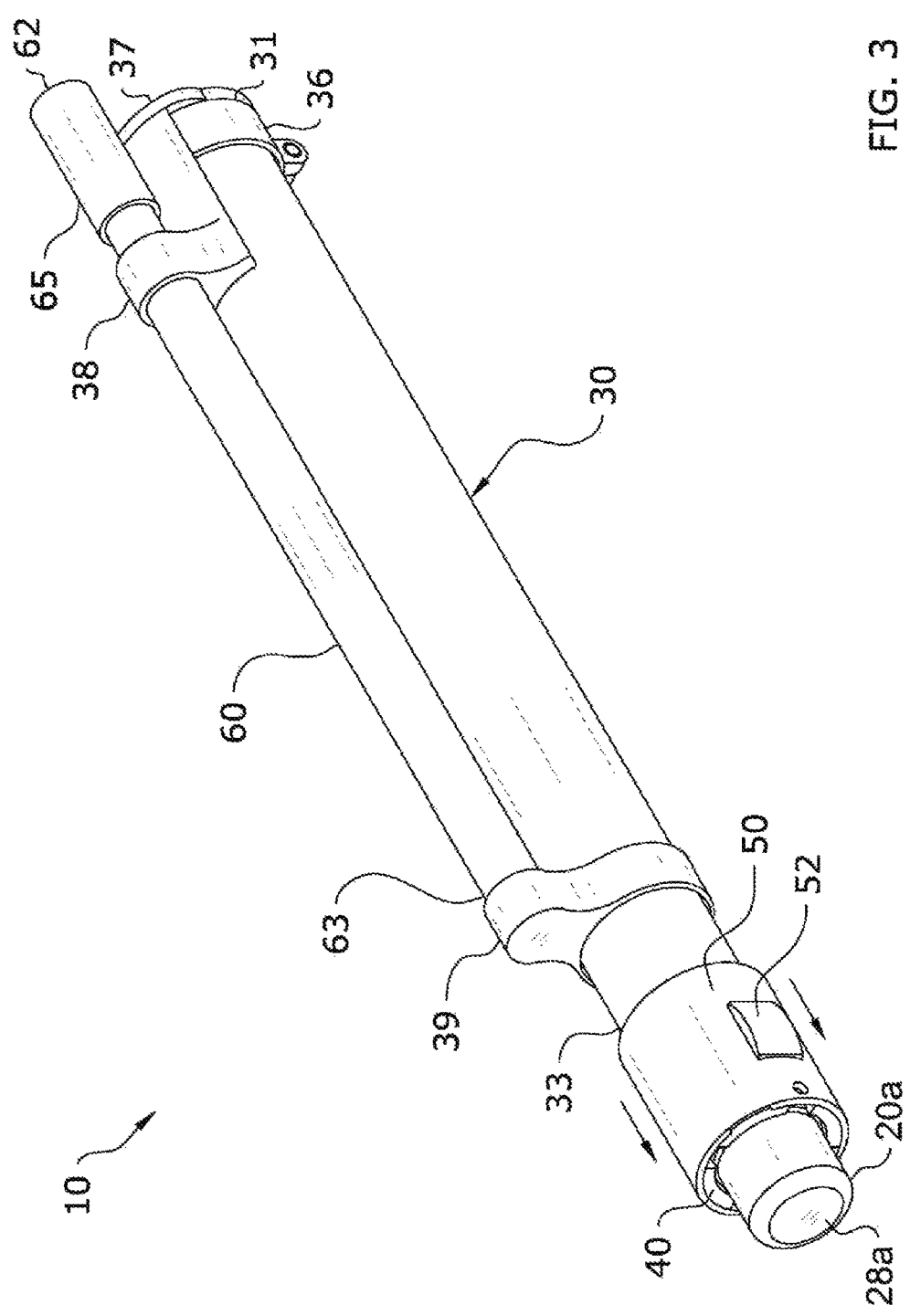
FIG. 3 is a perspective view of the handling unit of FIG. 1, with a cleaning cartridge positioned therein.

The outermost cleaning cartridge 20a is secured by a nozzle 40 so as to partially extend through the outlet opening 34 as best shown in FIG. 3. The nozzle 40 is positioned adjacent the second end 33 of the handling unit 30 so as to surround the outlet opening 34 thereof.

The nozzle 40 acts to retain the cleaning cartridge 20a within the outlet opening 34 prior to use. The nozzle 40 also acts as an anchor on the cleaning cartridge 20a such that the outer housing 28a thereof may be broken or removed to allow the fingers 7 to extend, thereby expanding the cleaning element 26a attached thereto. The nozzle 40 is also configured to expand to release the spend cleaning cartridge 20a after use, such that the next cleaning cartridge 20b in the channel 35 is then moved forward and partially retained within the nozzle 40 for later use.

The nozzle 40 may be comprised of various structures capable of removably securing one of the cleaning cartridges 20 therein. In a sample embodiment as shown in the figures, the nozzle 40 includes a plurality of adjustable fingers 42 which are adapted to engage with the cap 22a of the outermost cleaning cartridge 20a to retain it within the outlet opening 34. The fingers 42 are adapted to adjust outward to release the cleaning cartridge 20a upon activation of an outer sleeve 50 as discussed below.

Figure 6:
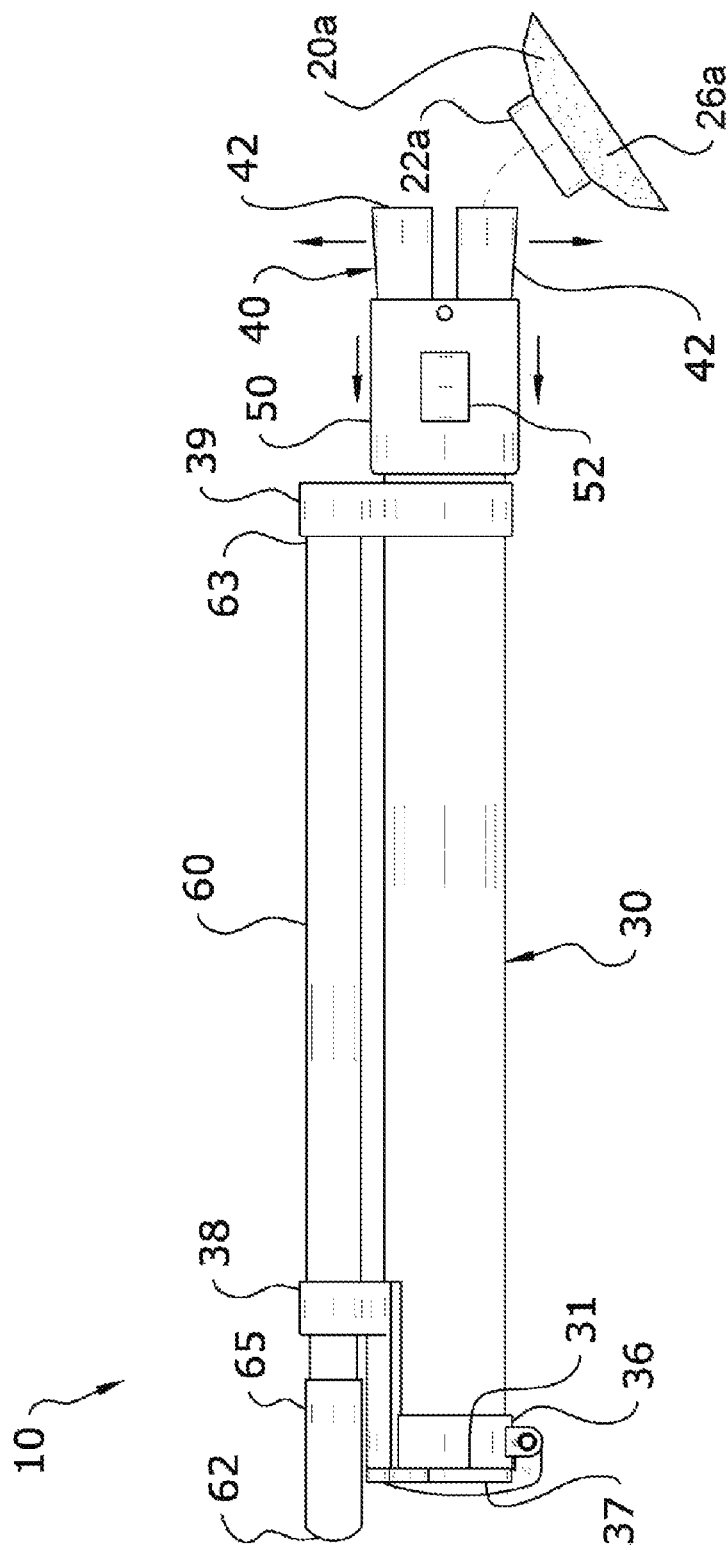
FIG. 6 is a side view of a cleaning cartridge being expelled from the handling unit of FIG. 1.
Figure 7:
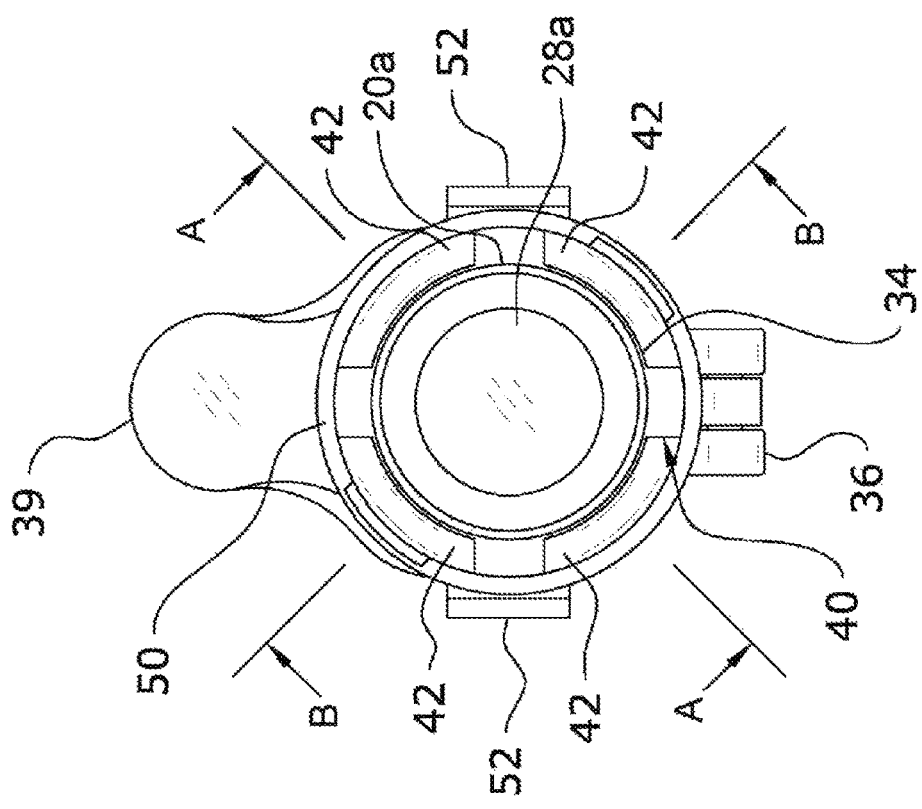
FIG. 7 is an end view of the handling unit of FIG. 1, with a cleaning cartridge positioned therein.
Figure 8:
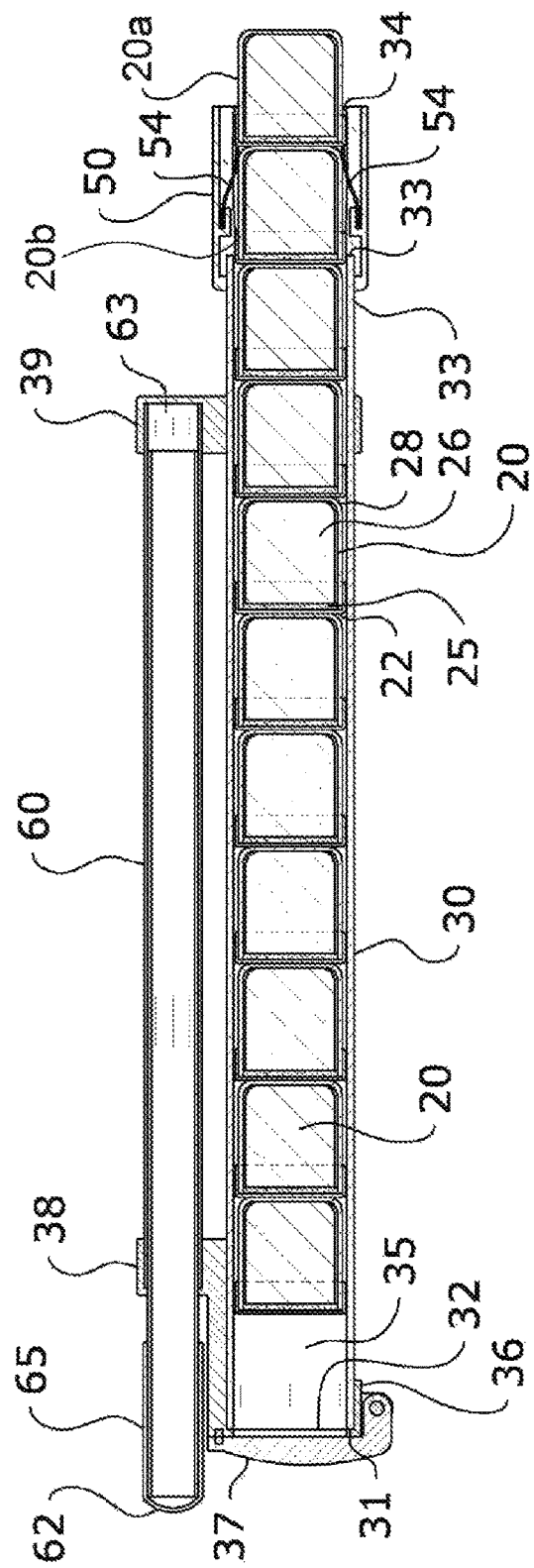
FIG. 8 is a side cross-sectional view of the handling unit of FIG. 1 and cleaning cartridges according to one embodiment of the present invention.
Figure 11:
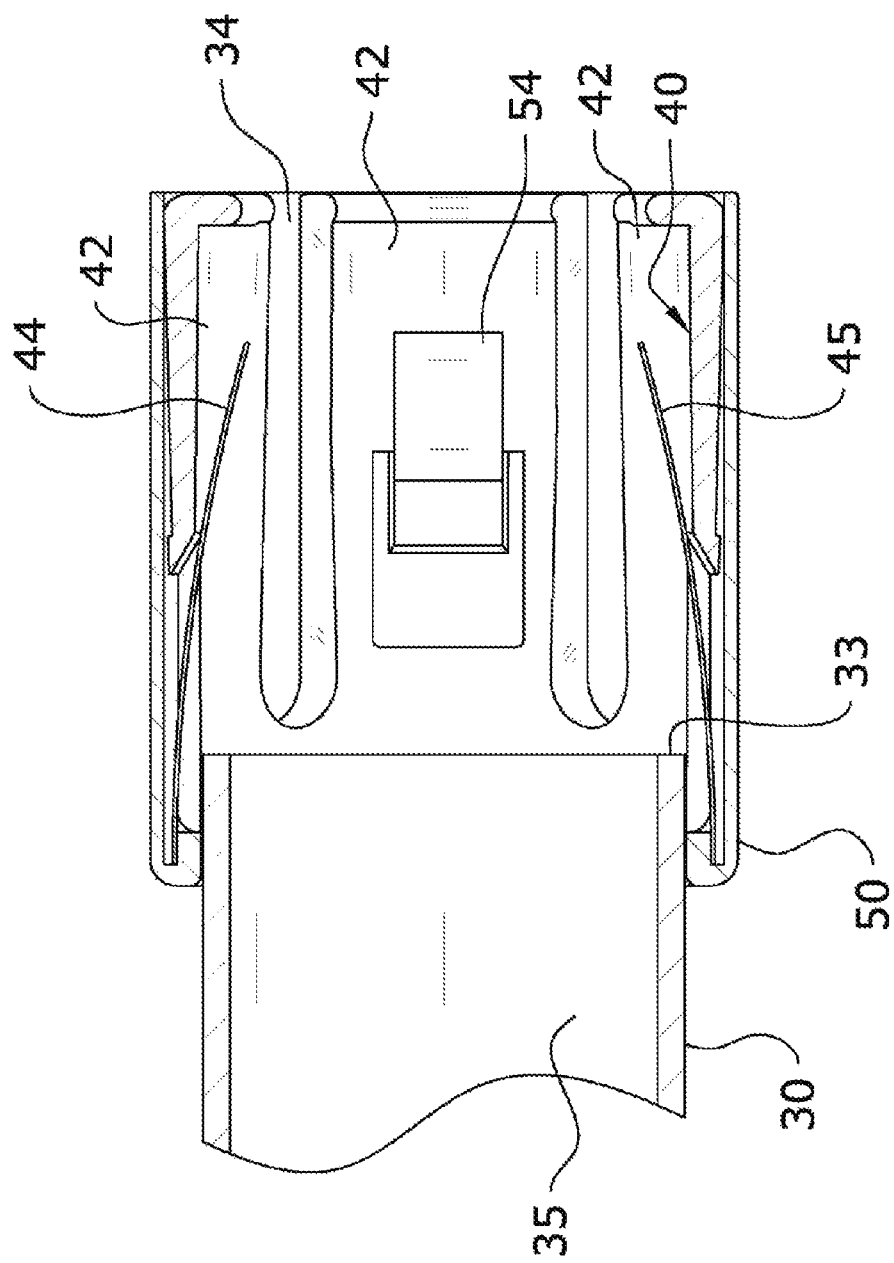
FIG. 11 is a cross-sectional view taken along line B-B of FIG. 7.
Figure 12:
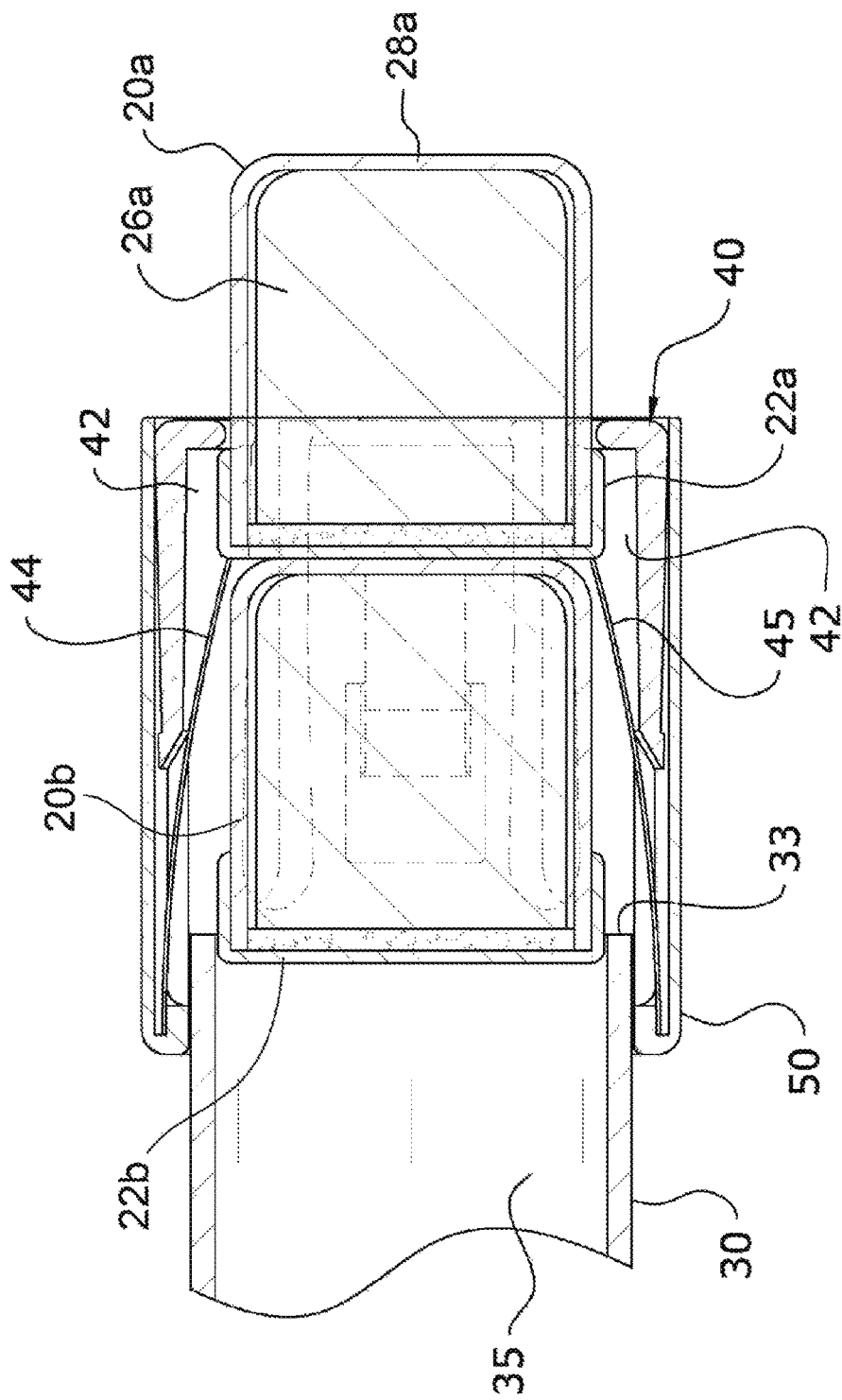
FIG. 12 is a second side cross-sectional view of the nozzle and cleaning cartridges of FIG. 11.

As best shown in FIG. 11, one or more of the fingers 42 of the nozzle 40 may include an inwardly-facing retaining member 44, 45 for preventing the un-used cleaning cartridges 20 within the channel 35 from falling through opening 34 when the fingers 42 are adjusted outwards to release the spend, outermost cleaning cartridge 20a as shown in FIG. 6.

Figure 9:
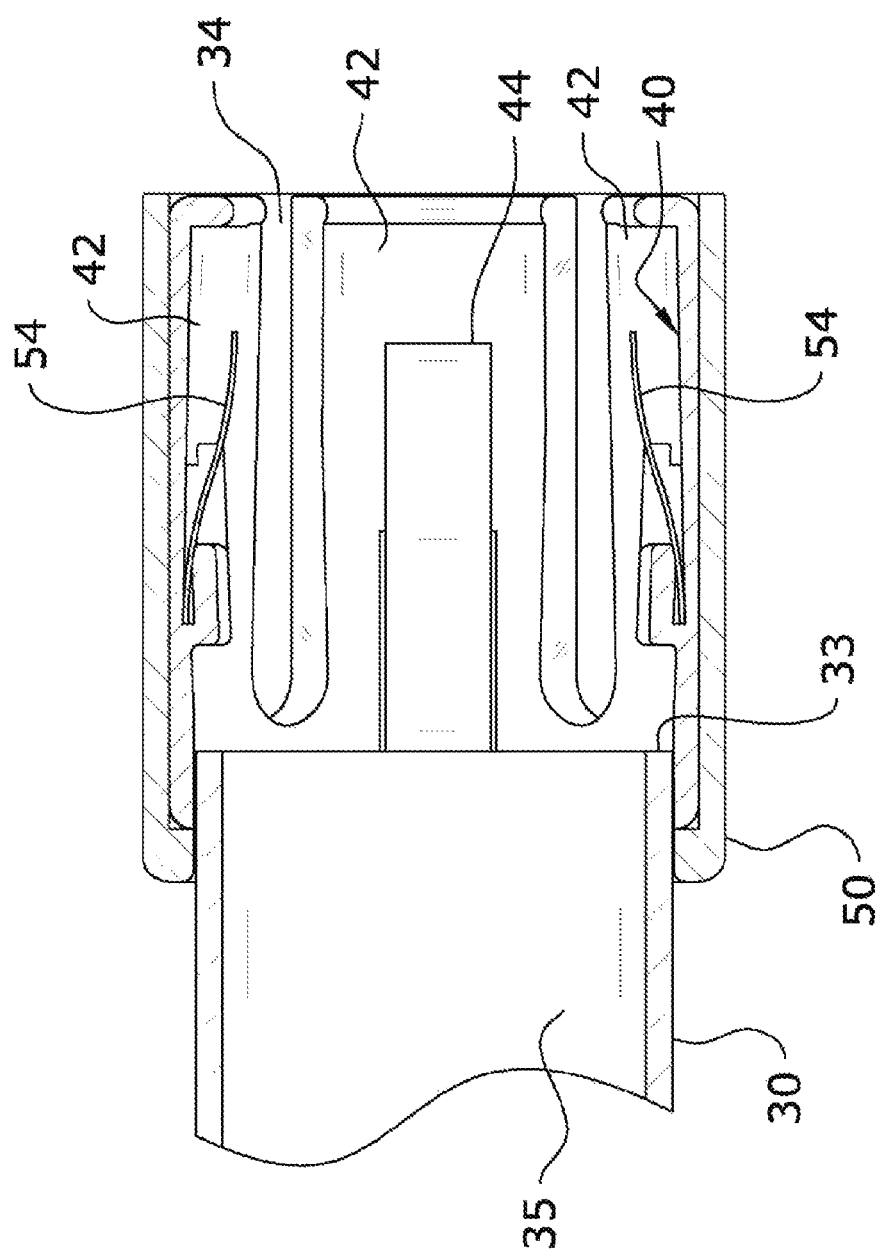
FIG. 9 is a cross-sectional view taken along line A-A of FIG. 7.
Figure 10:
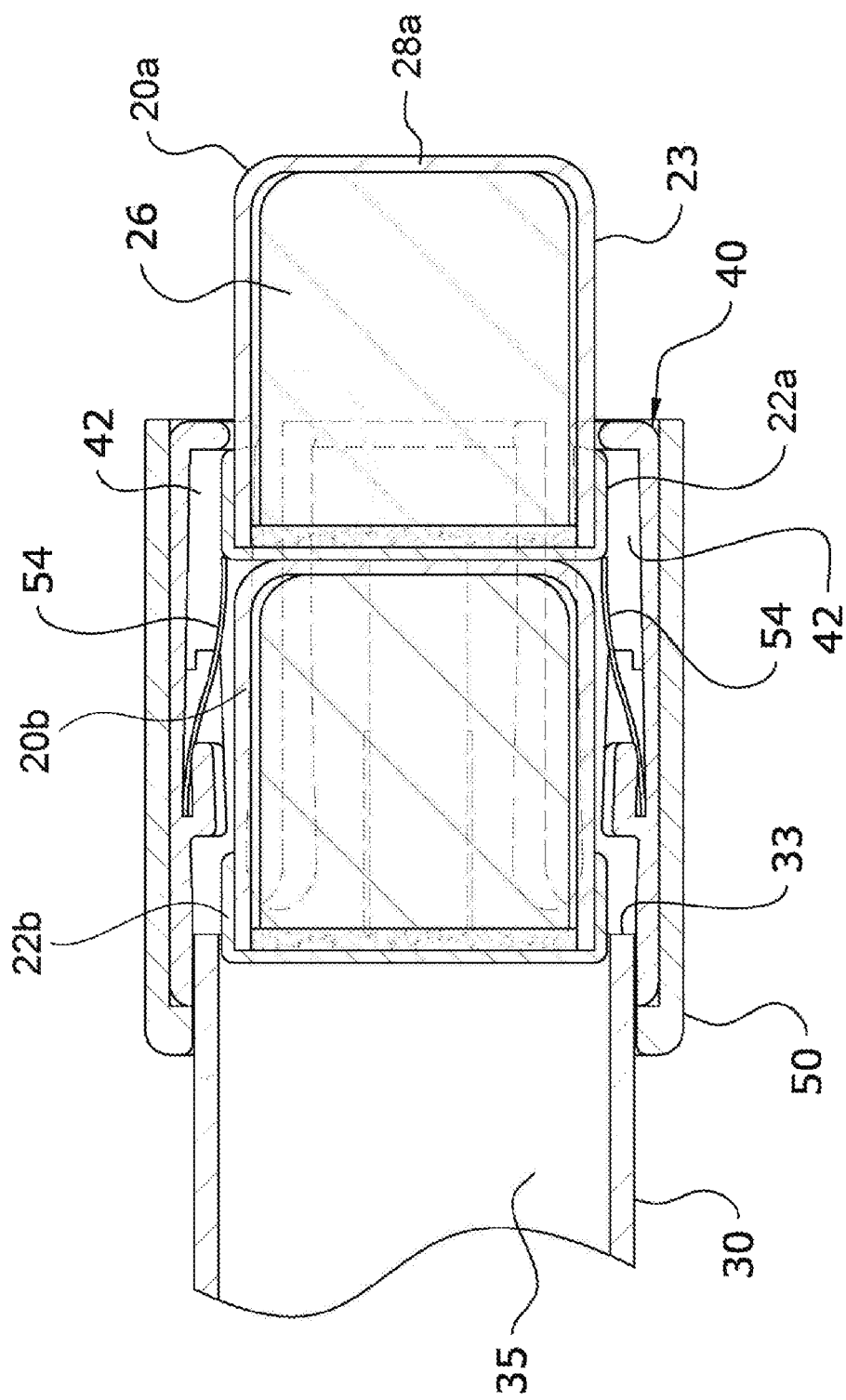
FIG. 10 is a first side cross-sectional view of the nozzle and cleaning cartridges of FIG. 9.

Preferably, a first retaining member 44 comprised of a flexible, tapered elongated member is secured to a first finger 42 and a second retaining member 45 similarly comprised of a flexible, tapered elongated member is secured to a second finger 42 as shown in FIGS. 9 and 11. As best shown in FIG. 10, the retaining members 44, 45 taper toward each other so as to engage with the cap 22b of the next cleaning cartridge 20b so as to prevent it from being expelled along with the spent cleaning cartridge 20a when the adjustable fingers 42 are opened.

The retaining members 44, 45 help retain unspent cleaning cartridges 20 within the channel 35 when the outer sleeve 50 is pulled back. When the outer sleeve 50 is returned to position, the next cleaning cartridge 20b is then engaged by the fingers 42 of the nozzle 40, thereby becoming the outermost cleaning cartridge, and is ready for use.

ii. Outer Sleeve

Figure 2:
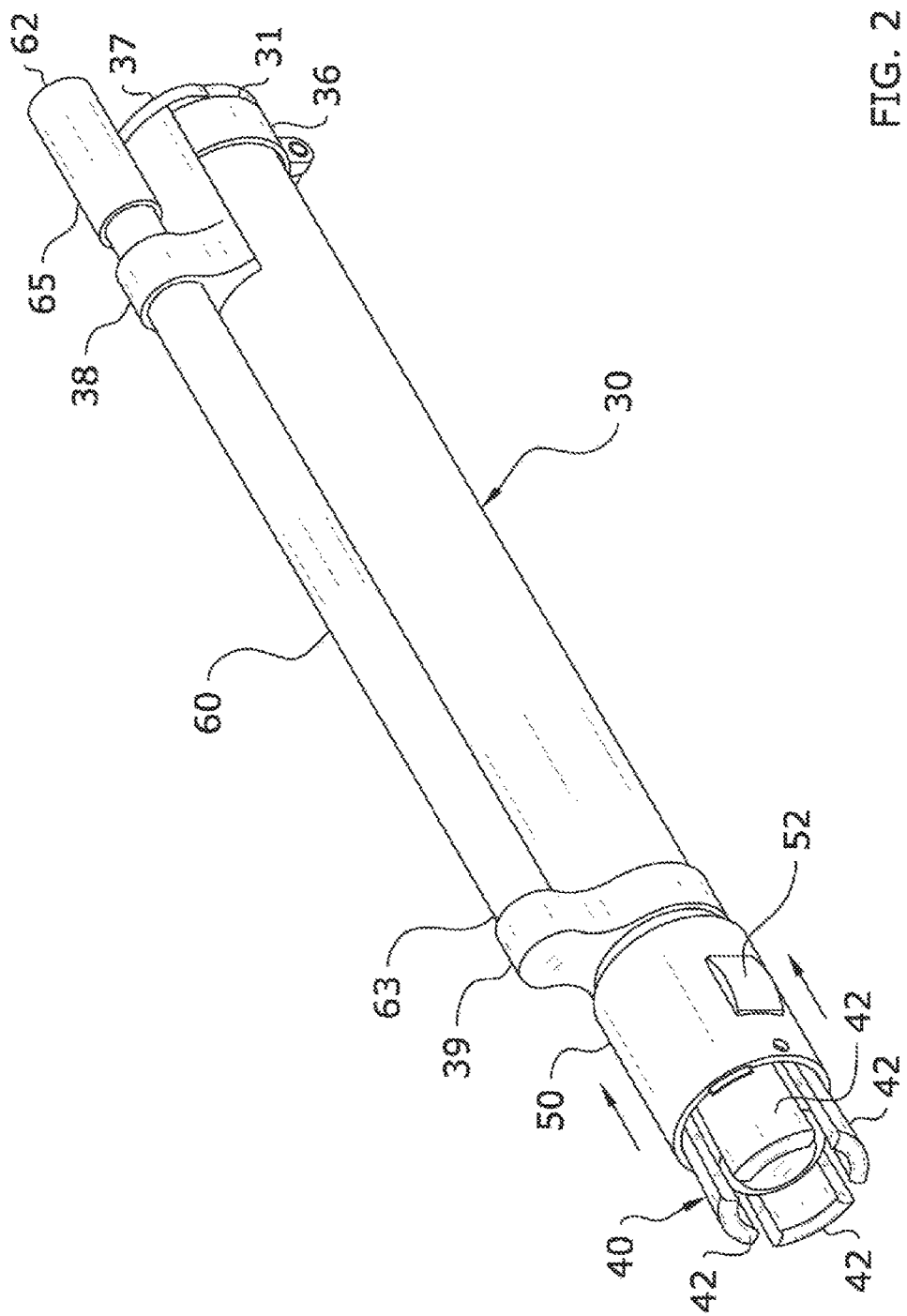
FIG. 2 is a perspective view of the handling unit of FIG. 1, with the outer sleeve pulled back to expose to nozzle.

As shown throughout the figures, the handling unit 30 includes an outer sleeve 50 which is manipulated to open and close the nozzle 40 around the outermost cleaning cartridge 20a. The outer sleeve 50 is generally comprised of a collar which is slideably secured around the outlet opening 34 of the handling unit 30 as best shown in FIGS. 2 and 3.

Figure 1:
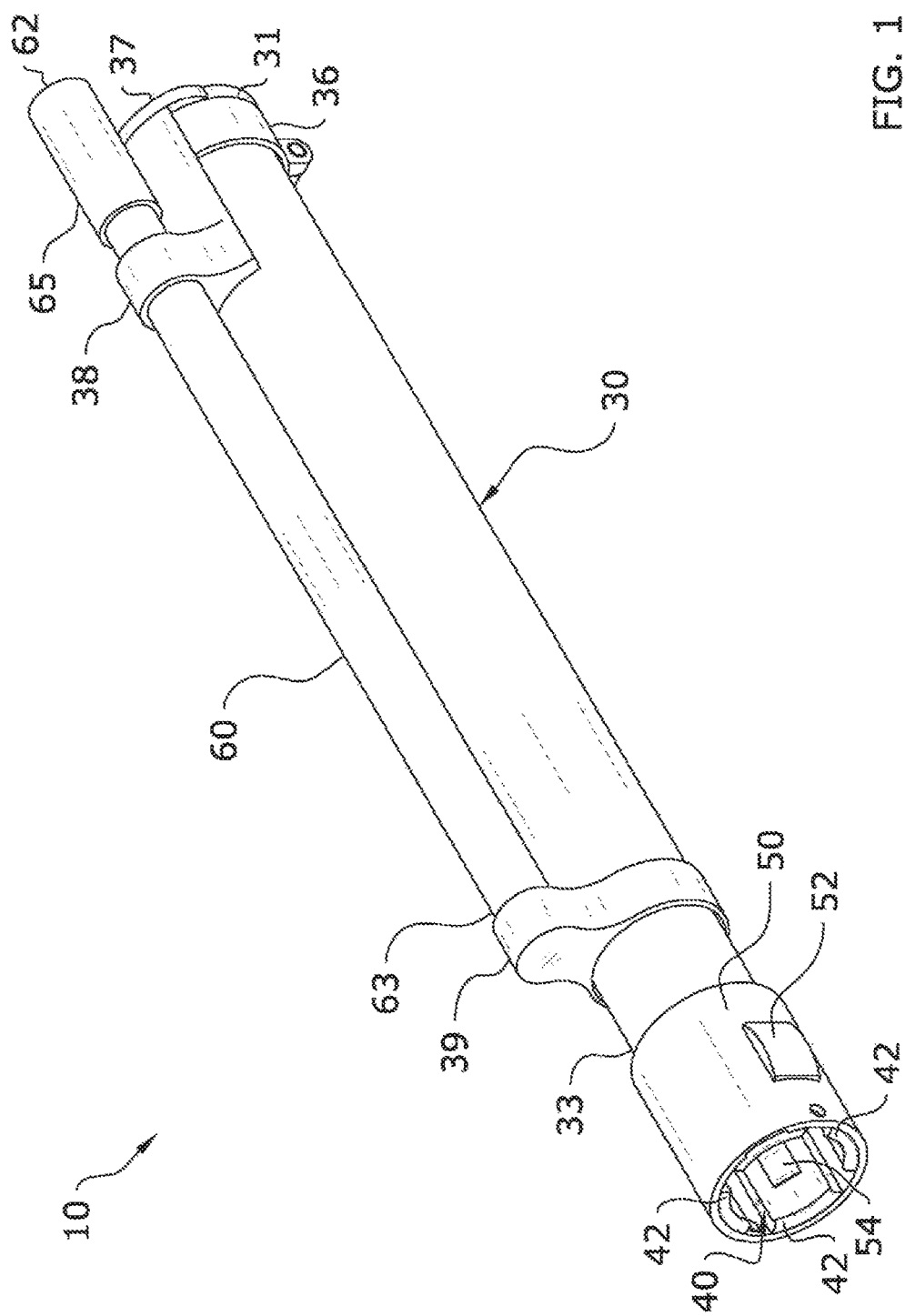
FIG. 1 is a perspective view of the handing unit according to one embodiment of the present invention.

The outer sleeve 50, when positioned over the nozzle 40 as shown in FIG. 1, closes the adjustable fingers 42 so that they engage with the cap 22a of the outermost cleaning cartridge 20a to partially retain the outermost cleaning cartridge 20a within the outlet opening 34. When the outer sleeve 50 is slid back and retracted from the nozzle as shown in FIG. 2, the adjustable fingers 42 of the nozzle 40 expand outwards to release the spent cleaning cartridge 20a as shown in FIG. 6. When the outer sleeve 50 is returned to its rested position, such as by pushing the outer sleeve 50 manually, an advancement member 54 engages with and pushes forward the next cleaning cartridge 20b and the adjustable fingers 42 closes around the next cleaning cartridge 20b, which then becomes the outermost cleaning cartridge and is ready for use. In some embodiments, instead of pushing/pulling the outer sleeve 50, it may be rotated in a first and/or second direction.

The outer sleeve 50 may include a gripping member 52 along its outer surface as shown throughout the figures to aid in pulling back the outer sleeve 50 to open the nozzle 40. The outer sleeve 50 preferably also includes an advancement member 54, such as a tab as shown in the figures, which is adapted to engage with and advance the next cleaning cartridge 20b in line after expelling the spent cleaning cartridge 20a. When the outer sleeve 50 is pushed back into its rested position flush with the nozzle 40, the advancement member 54 pushes the cleaning cartridge 20b through the retainer members 44, 45 to partially extend it through the nozzle 40.

iii. Handle

Figure 4:
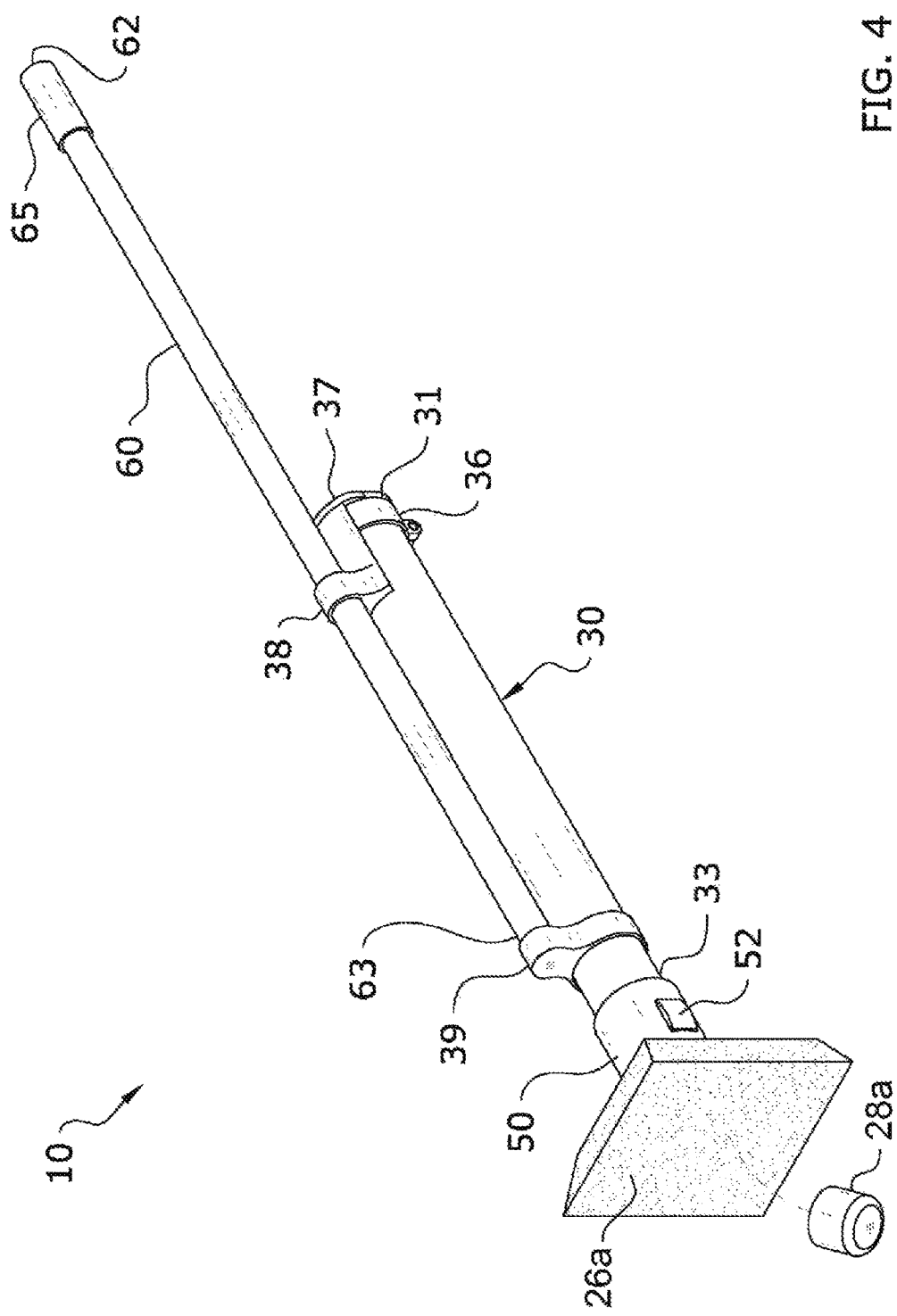
FIG. 4 is a perspective view of the handling unit of FIG. 1, with an expanded cleaning element extending therefrom.
Figure 5:
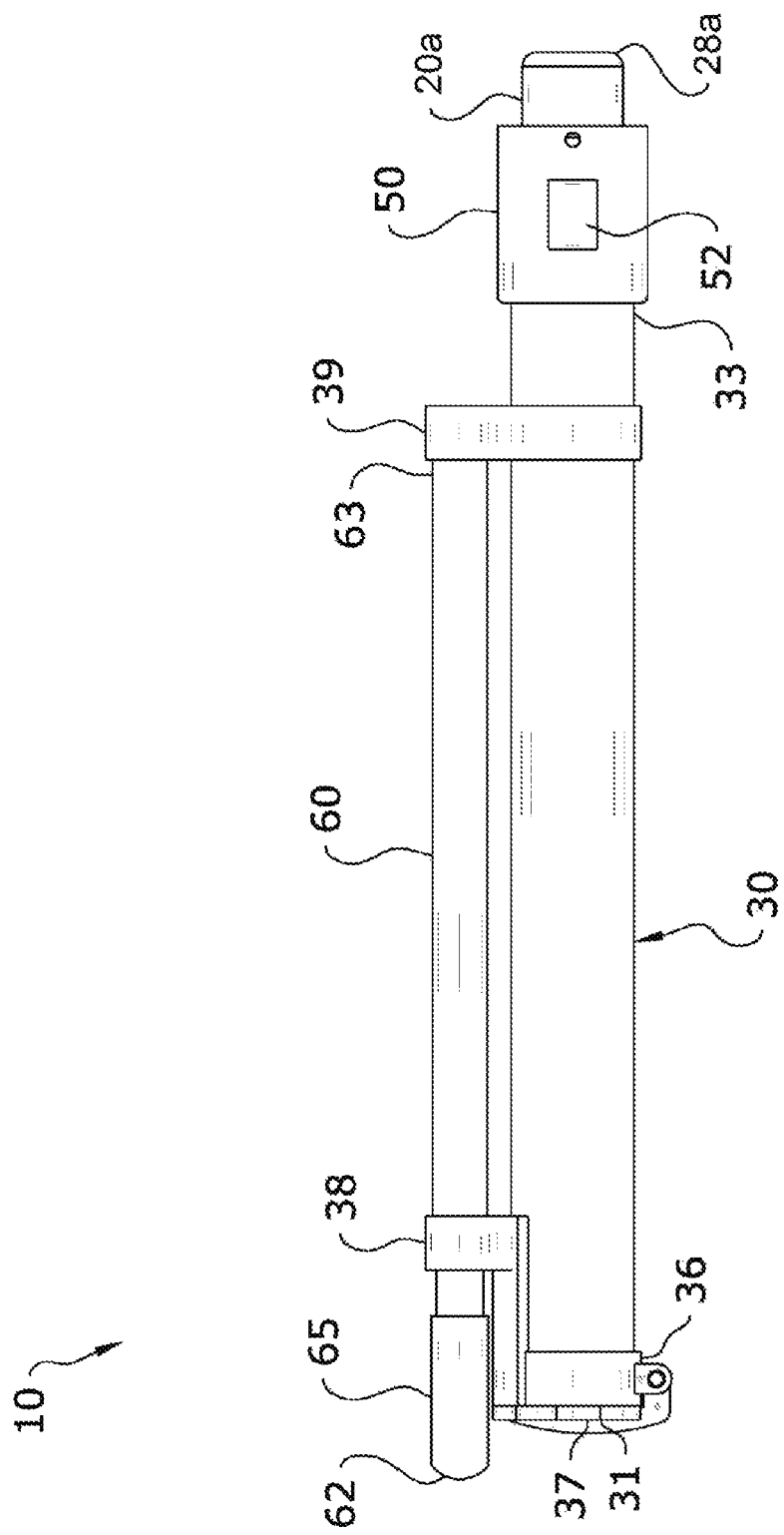
FIG. 5 is a side view of the handling unit of FIG. 1, with a cleaning cartridge positioned therein.

As best shown in FIGS. 1 and 4, the handling unit 30 may include an attached handle 60 which may be used to extend the reach of the handling unit 30 so that it may serve as a mop or other elongated cleaner. The handle 60 is generally secured parallel to the handling unit 30 via a pair of brackets 38, 39. The first end 62 of the handle 60 preferably extends through the first bracket 38 and includes a gripping portion 65 to be grasped by a user. The second end 63 of the handle 60 is preferably secured within the second bracket 39 of the present invention.

In one embodiment, the handle 60 includes a telescoping mechanism which may involve any known method in the art for allowing an elongated member to be telescopically configured. In alternate embodiments, the handle may 60 also be comprised of a pivoting and/or fixed configuration. The scope of the present invention should not be construed as limited by the figures as it pertains to the configuration, shape, or size of the handle 60.

iv. Operation

In use, the cleaning cartridges 20 are first inserted into the channel 35 of the dispensing unit 30 by opening the hinged cap 37 and inserted each cleaning cartridge 20 through the inlet opening 32. The outermost cleaning cartridge 20a is partially retained within the outlet opening 34 by the adjustable fingers 42 of the nozzle 40. The hinged cap 37 may be closed when the channel 35 is filled with the proper and/or desired number of cartridges 20.

When ready for use, the outermost cleaning cartridge 20a may be activated by removing or breaking the outer covering 28a thereof to extend the fingers therein, thereby expanding and exposing the cleaning element 26a (as shown for example in FIG. 4). The cleaning element 26a, which is stored within the dosed outer covering 28a in a compacted state, expands upon removal or breaking of the outer covering 28a to be ready for use in cleaning. If desired, the handle 60 may be telescoped outward so as to use the dispensing unit 30 as a mop.

Upon completion of cleaning, the spent cleaning cartridge 20a may be expelled by pulling the outer sleeve 50, which exposes the adjustable fingers 42 of the nozzle 40 and allows them to expand outwards to expel the spent cartridge 20a. The remaining cartridges 20 are retained within the channel 35 of the dispensing unit 30 by the retaining members 44, 45 of the nozzle 40. The outer sleeve 50 may then be pushed forward again, at which time the advancement member 54 engages with the next cleaning; cartridge 20b in line and push it forward into the nozzle 40 to be partially retained therein for further use.

Front Loading Handling Unit

FIGS. 27 to 31 show an alternative handling unit 130 for storing, activating, dispensing, and/or dispensing the cleaning cartridges 20 of the present invention. The handling unit 130 comprises a substantially tubular member having a first end 131 and a second end 133. A primary channel 135 runs through the handling unit 130 between its first and second ends 131, 133. The handling unit 130 may include a secondary channel 167 for housing an extendible handle 160 to the handling unit 130 as shown in the figures and discussed herein. The long axis of the secondary channel 167 is preferably substantially parallel to that of the primary channel 135. In one embodiment, the extendible handle 160 comprises a telescoping mechanism to allow the handle 160 to extend and retract as desired. In some embodiments, the handling unit 130 may include an attached light and/or bottle (not shown).

In one embodiment, the second end 133 of the handling unit 130 includes an outlet opening 134 through which cleaning cartridges 20 may be inserted into the channel 135. The cleaning cartridges 20 are also activated at outlet opening 134 for use and dispensed after use. The cleaning cartridge 20a that is located at outlet opening 134 (the "outermost cleaning cartridge") preferably partially extends out of the outlet opening 134 of the handling unit 130 prior to activation.

An outer sleeve 150 is positioned at the outlet opening 134 for receiving cleaning cartridges 20 into channel 135 and for activating and dispensing the outermost cleaning cartridge 20a as discussed below.

i. Outer Sleeve

The outer sleeve 150 comprises at inner surface defining an inner bore, an outer surface, a loading mechanism to allow one or more cleaning cartridges to be loaded into the handling unit 130 and placed in a storage position (i.e. where the cleaning cartridges are secured inside handling unit 130) and a ready position (i.e. where the outermost cleaning cartridge is ready for use), and a dispensing mechanism to allow the one or more cleaning cartridges to be loaded into the handling unit 130 and to release the cap 22 of the outermost cleaning cartridge (e.g. to dispose of the cleaning element after use).

The loading mechanism and dispensing mechanism are preferably positioned adjacent the second end 133 of the handling unit 130. The loading mechanism, when activated, allows one or more cleaning cartridges to be loaded into channel 135 via outlet opening 134. Preferably, the dispensing mechanism is configured to passively allow (i.e. without activation) the one or more cleaning cartridges to pass thereby unrestricted while they are being loaded into channel 135. The loading mechanism also acts to retain the cleaning cartridge 20a within the outlet opening 134 in a storage position prior to use. In the storage position, the outermost cleaning cartridge 20a is secured by the loading mechanism and may partially extend through the outlet opening 134. The loading mechanism, when activated, allows the cleaning cartridge 20a to transition from the storage position to the ready position.

In the ready position, the outermost cleaning cartridge 20a is secured by both the loading mechanism and the dispensing mechanism so as to allow all or a substantial axial portion of the outer housing 28a of cleaning cartridge 20a extends beyond the outlet opening 134. The loading mechanism and the dispensing mechanism also engage the cleaning cartridge 20a in a manner that minimizes any axial movement of the cleaning cartridge 20a relative to the handling unit 130, thereby anchoring cleaning cartridge 20a such that the outer housing 28a may be broken or removed to allow the fingers of the cleaning cartridge 20a to extend, thereby expanding the cleaning element 26a attached thereto. The dispensing mechanism, when activated, disengages from the cleaning cartridge 20a to release the spent cleaning cartridge 20a after use, which allows the next cleaning cartridge 20b in the channel 135 to move towards outlet opening 134 into the storage position. The loading mechanism is configured to retain the next cleaning cartridge in the outer sleeve while the spent cleaning cartridge is being released.

In the sample embodiment as shown in the figures, the inner surface of outer sleeve 150 includes axially extending grooves 140a, 140b for receiving tabs 9 of cap 22 as a cleaning cartridge is inserted into outer sleeve 150 and for allowing the passage of same therethrough as the cleaning cartridge is pushed past sleeve 150 and is loaded into channel 135. The loading mechanism comprises a first pair of levers 153 pivotable by a first pair of buttons 152, and the dispensing mechanism comprises a second pair of levers 155 pivotable by a second pair of buttons 154. The first pair of levers each has a hook end 156 for extending inwardly, towards the central long axis of sleeve 150, into a first set of grooves 140a of outer sleeve 150, thereby blocking the passage of the grooves 140a. The second pair of levers each has a hook end 157 for extending inwardly, towards the central long axis of sleeve 150, into a second set of grooves 140b of outer sleeve 150, thereby blocking passage of the grooves 140b.

In a preferred embodiment the first and second pairs of levers 153, 155 are spring-loaded to bias the hooks to extend inwardly into the grooves 140a, 140b. The first pair of buttons 152, when pressed, activates the first pair of levers 153, whereby the levers 153 are pivoted to retract the hooks 156 to unblock the passages of grooves 140a. When buttons 152 are released, the levers 153 are deactivated and the hooks 156 return to their biased position, where they extend inwardly into the grooves 140a. The second pair of buttons 154, when pressed, activates the second pair of levers 155, whereby the levers 155 are pivoted to retract the hooks 157 to unblock the passages of grooves 140b. When buttons 154 are released; the levers are deactivated and the hooks 157 return to their biased position, where they extend inwardly into the grooves 140b.

Levers 153 each have an outer end that is closer to the outlet opening 134 than the other end and the outer end is shaped such that when levers 153 are deactivated and when a cleaning cartridge inserted from outlet opening 134 encounters the outer ends of levers 153 and exerts a force in the direction of end 131 thereon, the cleaning cartridge cannot urge the hooks 156 of levers 153 to retract. As a result, the cleaning cartridge is restricted from advancing beyond the outer ends of levers 153. In a sample embodiment, as shown in FIG. 29, the outer end of each lever 153 is blunt so that when it extends in the groove 140a, it provides a shoulder 142 which restricts a cleaning cartridge inserted from the outlet opening 134 (or the outermost cleaning cartridge 20a) from advancing axially towards end 131.

Levers 155 each have an outer end that is closer to the outlet opening 134 than the other end and the outer end is shaped such that when levers 155 are deactivated and when a cleaning cartridge inserted from outlet opening 134 encounters the outer ends of levers 155 and exerts a force in the direction of end 131 thereon, the cleaning cartridge can urge the hooks 157 of levers 155 to retract to allow the passage of the cleaning cartridge therethrough. In a sample embodiment, as shown in FIG. 31, outer ends of levers 155 are sloped inwardly in the direction of end 131, or in other words the outer ends are tapered radially outwardly in the direction away from end 131. The sloping (or tapering) avoids the presence of a shoulder that would block the advancement of a cleaning cartridge towards end 131. Instead, the sloping (or tapering) allows a cleaning cartridge inserted from outlet opening 134 to urge the hooks 157 of levers 155 to retract when a force is exerted on the cartridge in the direction of end 131. Therefore, levers 155 are configured to passively allow (i.e. without activation) the passage and advancement of cleaning cartridges into channel 135 towards end 131 as the cartridges are inserted from outlet opening 134.

Preferably, the loading mechanism and the dispensing mechanism are separated radially on outer sleeve 150, which allows the loading mechanism to engage a different radial location of cap 22 than the dispensing mechanism. Further, the loading mechanism and the dispensing mechanism are preferably placed on different axial locations on the outer sleeve 150, which allows the loading mechanism to engage cap 22 at a different axial location of the inner bore of the outer sleeve 150 than the dispensing mechanism.

For example, as shown particularly in FIGS. 29 to 31, the inner surface of outer sleeve 150 has four grooves 140a, 140b, each for receiving one of the four tabs 9 of cleaning cartridge 20a. In this embodiment, adjacent tabs 9 are separated radially by about 90° and adjacent grooves 140 are also separated radially by about 90°. The first pair of levers 153 is positioned such that hooks 156 can each extend into one of the first set of grooves 140a, which are shown, for example, to be separated radially by about 180°. The second pair of levers 155 is positioned such that hooks 157 can each extend into one of the second set of grooves 140b, which may also be separated radially by about 180°. As a result, hooks 156 block the grooves 140a and the first pair of buttons 152, when pressed, unblocks the grooves 140a. Similarly, hooks 157 block the grooves 140b and the second pair of buttons 154, when pressed, unblocks the grooves 140b.

In the sample embodiment, the first pair of hooks 156 is situated at an axial location of the inner bore that is further away from the outlet opening 134 than the axial location of the second pair of hooks 157. The distance between the axial locations of the first and second pairs of hooks 156, 157 is preferably about the same as or slightly greater than the axial length of the tabs 9. The axial spacing of the hooks 156, 157 helps prevent the unused cleaning cartridges 20 within the channel 135 from falling through opening 134 when hooks 157 disengages from the outermost cleaning cartridge 20a to release same. For example, hooks 156 are positioned and configured to engage the cap of the next cleaning cartridge 20b, to prevent it from being expelled along with the spent outermost cleaning cartridge 20a when hooks 157 are retracted from the grooves 140b to disengage from tabs 9 of cleaning cartridge 20a.

While the sample embodiment shows four tabs on cap 22a and four grooves 140a, 140b in the inner surface of outer sleeve 150, it can be appreciated that other numbers of tabs and/or grooves can be used for the present invention and the numbers of tabs and grooves do not necessarily have to be the same.

Hooks 156 help retain the unspent cleaning cartridges within the channel 135. When the outermost cleaning cartridge is released, the next cleaning cartridge 20b moves forward towards opening 134 and its axial movement is restricted by hooks 156. When the next cleaning cartridge is engaged by hooks 156, it is in the storage position and becomes the outermost cleaning cartridge. To transition the cleaning cartridge 20b from the storage position to the ready position, levers 153 are activated by pressing buttons 152 to disengage hooks 156 from the cap of cleaning cartridge 20b, thereby allowing cleaning cartridge 20b to move forward towards opening 134 until its axial movement is blocked by hooks 157 of the second pair of levers 155. Once its cap is engaged by hooks 157, the cleaning cartridge 20b is placed in the ready position such that its outer housing may be removed to allow its cleaning element to expand for use.

ii. Handle

Figure 27C:
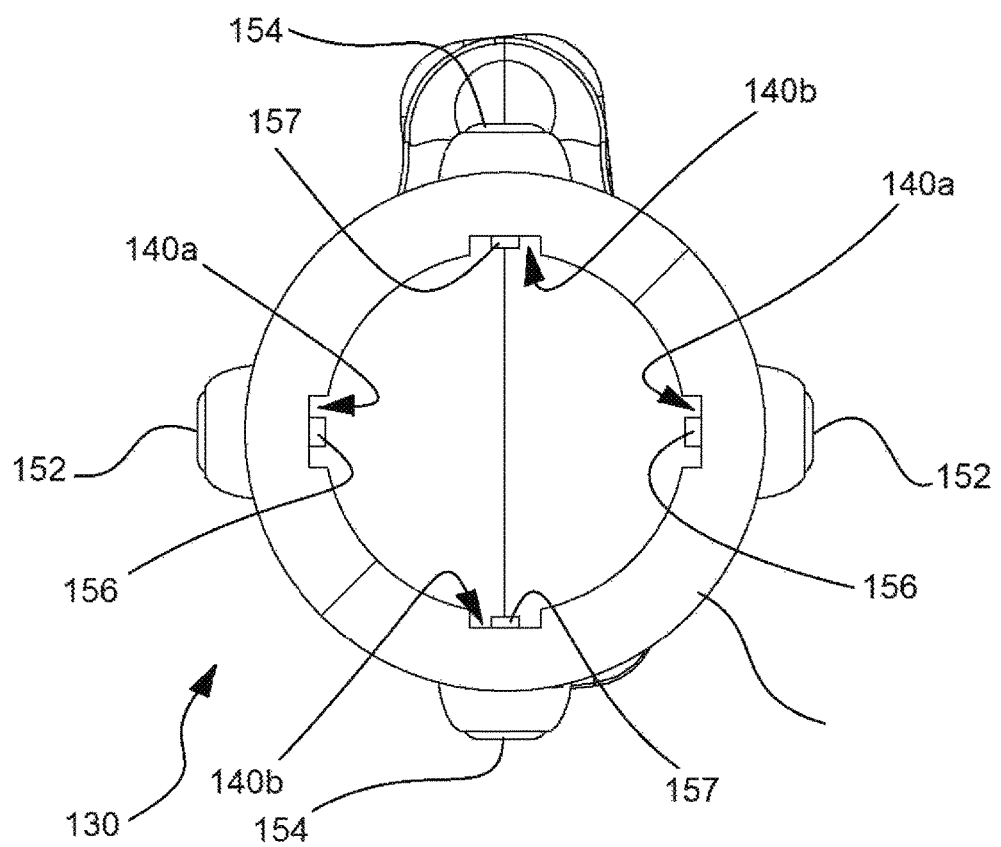

As best shown in FIGS. 27 and 28, the handling unit 130 may include an attached handle 160 which may be used to extend the reach of the handling unit 130 so that it may serve as a mop or other elongated cleaner. The handle 160 is generally secured substantially parallel to the handling unit 130 via secondary channel 167. The first end 162 of the handle 160 preferably extends beyond the length of the secondary channel and includes a gripping portion 165 to be grasped by a user. The second end of the handle 160 (not shown) is preferably secured within the secondary channel.

In one embodiment, the handle 160 includes a telescoping mechanism which may involve any known method in the art for allowing an elongated member to be telescopically configured. In alternate embodiments, the handle may 160 also be comprised of a pivoting and/or fixed configuration. The scope of the present invention should not be construed as limited by the figures as it pertains to the configuration, shape, or size of the handle 160.

iii. Operation

To use the cleaning system, one or more cleaning cartridges 20 are first inserted, one at a time, into the channel 135 of the handling unit 130 through outlet opening 134, with its cap-side towards end 131 and with each of tabs 9 aligned with and received in one of grooves 140a, 140b. To allow the one or more cleaning cartridges to advance into channel 135, the loading mechanism is activated. For example, in the above-described sample embodiment, levers 153 are activated by depressing buttons 152 to retract hooks 156, thereby unblocking the grooves 140a to allow the passage of tabs 9 of each cleaning cartridge to pass through outer sleeve 150. As described above, the dispensing mechanism passively allows the passage of cleaning cartridges therethrough in the direction of end 131 as the cartridges are inserted from outlet opening 134. In the sample embodiment, the levers 155 are configured to passively allow cleaning cartridges inserted through outlet opening 134 to urge the hooks 157 to retract, thereby permitting the cartridges to advance towards end 131 from outlet opening 134, when levers 153 are activated.

If more than one cleaning cartridges are loaded into channel 135 and if the caps 22 of the cartridges are configured to receive a portion of the outer housing 28 of an adjacent cartridge, the cartridges may be positioned in channel 135 in a stacked arrangement as shown, for example, in FIG. 26.

After the last cleaning cartridge is loaded into the handling unit 130 through outlet opening 134, the loading mechanism is deactivated (e.g. the buttons 152 are released and hooks 156 re-block the grooves 140a). The handling unit 130 is then positioned such that end 133 is close to the ground than end 131. As the last cleaning cartridge falls towards outlet opening 134 due to the force of gravity, it becomes the outermost cleaning cartridge 20a and the loading mechanism engages the cartridge 20a to prevent it from following through outlet opening 134. For example, hooks 156 engage a lower edge of tabs 9 of the cap of the outermost cleaning cartridge 20a to restrict the cartridge's axial movement towards outlet opening 134. The outermost cleaning cartridge 20a is now in the storage position, as shown for example in FIG. 29.

To transition the outermost cleaning cartridge 20a from the storage position to the ready position, the loading mechanism is activated. For example, buttons 152 are pressed to retract hooks 156 to disengage hooks 156 from tabs 9 of cartridge 20a, thereby allowing cartridge 20a to advance towards outlet opening 134 until the cartridge 20a encounters, and its movement is stopped by, the dispensing mechanism. For example, as tabs 9 are released from hooks 156, cartridge 20a falls towards outlet opening 134 until tabs 9 encounter hooks 157 of levers 155. The hooks 157 engage the lower edge of tabs 9 of cartridge 20a to restrict the cartridge's axial movement towards outlet opening 134. The outermost cleaning cartridge 20a is now in the ready position, as shown for example in FIG. 31. In a preferred embodiment, when in the ready position, the cartridge 20a is also restricted from moving axially towards end 131 of the handling unit 130 by the loading mechanism. For example, as shown in FIG. 30, when the cartridge 20a is in the ready position, the outer ends of levers 153 engage an upper edge of tabs 9 such that shoulders 142 prevent cartridge 20a from advancing towards end 131. In other words, when the cartridge 20a is in the ready position, its axial movement in both directions is limited by both the loading mechanism and the dispensing mechanism. In the ready position, preferably all or substantially all of the outer housing 28a of cleaning cartridge 20a extends beyond the outlet opening 134.

When ready for use, the outermost cleaning cartridge 20a may be activated by removing or breaking the outer covering 28a thereof to extend the fingers therein, thereby expanding and exposing the cleaning element 26a (as shown for example in FIG. 28). The cleaning element 26a, which has been stored within the closed outer housing 28a in a compacted state, expands upon removal or breaking of the outer housing 28a to provide a cleaning surface to be ready for use in cleaning. If desired, the handle 160 may be extended axially so as to allow a user to use the handling unit 130 as a mop.

If space is limited, the handle 160 can be used in a folded or shortened configuration. If space is available, the handle 160 can be fully extended for cleaning the floor without the need to bend down.

Upon completion of cleaning or whenever desired, the spent cleaning cartridge 20a may be expelled by activating the dispensing mechanism. For example, by pressing buttons 154, levers 155 are activated to retract hooks 157, thereby disengaging hooks 157 from tabs 9 of cartridge 20a. Once disengaged from hooks 157, the axial movement of tabs 9, along with the cap, towards outlet opening 134 is unrestricted and the cap of cartridge 20a can fall freely through outlet opening 134 by the force of gravity such that cartridge 20a is released from handling unit 130. Alternatively or additionally, handling unit 130 may include a spring (not shown) inside channel 135, for example near end 131, to bias the cleaning cartridges inside channel 135 towards outlet opening 134, such that when the outermost cleaning cartridge 20a is released from handling unit 130, the remaining cleaning cartridges inside channel 135 are urged forward towards outlet opening 134. During the expulsion of the outermost cleaning cartridge, the remaining cartridges 20 are retained within the channel 135 of the handling unit 130 by the loading mechanism. For example, as cartridge 20a falls away from outlet opening 134, the next cleaning cartridge 20b advances towards outlet opening 134 due to the force of gravity and/or by the spring inside channel 135. However, the advancement of cartridge 20b towards outlet opening 134 is restricted as soon as the lower edges of its tabs 9 encounter the hooks 156 of levers 153. The cartridge 20b is now placed in the storage position and becomes the outermost cleaning cartridge. The cartridge 20b can then be placed in the ready position, be used, and be expelled in the same manner as described above in relation to cartridge 20a.

Single Cartridge Handling Unit

In an alternative embodiment, the handling unit 130 may be configured to receive and hold only one cleaning cartridge for use at a time. In this embodiment, the loading mechanism is maintained (or may be locked) in the inactivated position. Alternatively, the loading mechanism (e.g. buttons 152 and levers 153) may be omitted, along with the first set of grooves 140a, and permanent shoulders or a wall may be positioned in the bore of outer sleeve 150, in order to restrict the cleaning cartridge's axial movement towards end 131 beyond a certain location.

A cleaning cartridge 20a is inserted into the bore of outer sleeve 153 via the outlet opening 134, with its cap end towards end 131 and its tabs aligned with the second set of grooves 140b. The second pair of levers 155 may allow the passage of the cap 22a actively (i.e. with activation of the levers) or passively (i.e. without activation of the levers). When the tabs 9 of the cleaning cartridge 20a move pass the hooks 157 of the second pair of levers 155, the hooks 157 automatically engage the lower ends of the tabs, preferably with the outer ends of levers 153 (or, if levers 153 are omitted, shoulders or a wall inside outer sleeve 150) abutting against the cap end of the cleaning cartridge, thereby securing the cleaning cartridge in place in the ready position. The cleaning cartridge 20a can then be used and expelled thereafter, as described above. An unused cleaning cartridge may be subsequently inserted into the handling unit, as described above, after the expulsion of the used cleaning cartridge 20a.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The embodiments which an exclusive property or privilege is claimed are defined as follows:

1. A cleaning cartridge, comprising:
    an outer housing having an inner surface defining a chamber and a mouth providing open access to the chamber;
    a cap for covering the outer housing at the mouth;
    a stiffening component having a compressed position and an extended position; and
    a cleaning element attached to the stiffening component, wherein in the compressed position, the stiffening component and cleaning element are compacted to fit into the chamber, and wherein in the extended position, the stiffening component extends to expand the cleaning element to provide a cleaning surface, and
    the cleaning cartridge having a closed position, wherein the stiffening component and cleaning element are disposed in the chamber in the compressed position and the cap is removably attached to the mouth of the outer housing to cover same and to secure the stiffening component inside the chamber; and
    an open position, wherein the cap is removed from the outer housing and the stiffening component is released from the outer housing into the extended position.

2. The cleaning cartridge of claim 1 wherein the stiffening component is a plurality of collapsible and extendible fingers.

3. The cleaning cartridge of claim 2 wherein the plurality of fingers are held together by a hub and are attached to the cap via the hub.

4. The cleaning cartridge of claim 3 wherein the hub comprises a chamber sealed by a breakable seal.

5. The cleaning cartridge of claim 1 wherein the chamber is configured to store cleaning fluid and the cleaning fluid is sealable in the chamber by the cap.

6. The cleaning cartridge of claim 5 wherein the chamber is sealed with a seal, and wherein the seal is intact in the compressed position and is broken in the extended position, thereby allowing cleaning fluid to flow therethrough.

7. The cleaning cartridge of claim 1 wherein the cap is connectable to the outer housing by a threaded connection.

8. The cleaning cartridge of claim 1 wherein the stiffening component is spring-loaded to bias itself toward the extended position.

9. The cleaning cartridge of claim 1 wherein, in the extended position, the stiffening component provides a substantially planar frame when pressed against a substantially flat surface.

10. The cleaning cartridge of claim 1 further comprising a mechanism for locking the stiffening component into the extended position.

11. The cleaning cartridge of claim 1 wherein the stiffening component comprises a hoop, and wherein, in the compressed position, the hoop is coiled and, in the extended position, the hoop is uncoiled.

12. The cleaning cartridge of claim 11 wherein the hoop comprises a hub and one or more veins extending radially outwardly from the hub, and the hoop is attached to the cap via the hub, and wherein in the compressed position the veins are coiled around the hub about a central axis of the hub, and in the extended position, the veins are uncoiled and extend away from the hub.

13. The cleaning cartridge of claim 11 wherein in the extended position the cleaning element is under tension.

14. The cleaning cartridge of claim 1 wherein the cleaning cartridge is loadable into and dispensable from a handling unit having a loading mechanism and/or a dispensing mechanism, and wherein the cap comprises an outer surface having a plurality of raised tabs extending radially outwardly therefrom, and the tabs are configured to interact with one or both of the loading mechanism and dispensing mechanism.

15. The cleaning cartridge of claim 1, further comprising a membrane that is penetrable to allow fluid to be injected into the chamber.

16. The cleaning cartridge of claim 15 wherein the membrane, when penetrated, permits fluid flow in one direction and restricts and/or reduces fluid flow in the opposite direction.

17. The cleaning cartridge of claim 1 wherein the cap comprises a seal for fluidly sealing the chamber.

18. A handling unit for storing, activating, dispensing, using, and/or disposing one or more cleaning cartridges, the one or more cleaning cartridges each comprising a cap removably attached to an outer housing, the handling unit comprising:
    a tubular member having a first end, a second end, a primary channel extending between the first end and second end;
    an outlet opening at or near the second end providing open access to the primary channel;
    an outer sleeve positioned at or near the outlet opening, the outer sleeve comprising:
    an inner surface defining an inner bore, an outer surface, a loading mechanism, and a dispensing mechanism,
    wherein the loading mechanism, when activated, allows the one or more cleaning cartridges to be loaded into the primary channel via the outlet opening and allows an outermost cleaning cartridge to transition from a storage position to a ready position, and
    wherein the dispensing mechanism, when activated, disengages and releases the outermost cleaning cartridge.

19. The handling unit of claim 18 wherein the dispensing mechanism passively allows the one or more cleaning cartridges to pass therethrough while the one or more cleaning cartridges are loaded into the channel.

20. The handling unit of claim 18 wherein the loading mechanism is configured to engage and retain the outermost cleaning cartridge when the outermost cleaning cartridge is in the storage position.

21. The handling unit of claim 18 wherein the loading mechanism and the dispensing mechanism are configured to engage and retain the outermost cleaning cartridge when the outermost cleaning cartridge is in the ready position, to minimize any axial movement of the outermost cleaning cartridge relative to the handling unit.

22. The handling unit of claim 18 wherein the cap has an outer surface having a plurality of radially outwardly extending tabs, and wherein the inner surface of the outer sleeve comprises a first set of axially extending grooves and a second set of axially extending grooves, each for receiving a tab therein and allowing the passage of the tab therethrough.

23. The handling unit of claim 22 wherein:
the loading mechanism comprises a first pair of levers, each having a hook end, and when the loading mechanism is deactivated, the hook end extends into one of the first set of grooves to block the passage of same, and when the loading mechanism is activated, the hook end retracts from the one of the first set of grooves to unblock the passage of same; and
the dispensing mechanism comprises a second pair of levers, each having a hook end, and when the dispensing mechanism is deactivated, the hook end extends into one of the second set of grooves to block the passage of same, and when the dispensing mechanism is activated, the hook end retracts from the one of the second set of grooves to unblock the passage of same.

24. The handling unit of claim 23 wherein the first pair of levers and the second pair of levers are spring-loaded to bias the hook ends into the first set of grooves and the second set of grooves, respectively.

25. The handling unit of claim 18 wherein the loading mechanism, when deactivated, is configured to restrict the one or more cleaning cartridges from advancing into the primary channel via the outlet opening.

26. The handling unit of claim 18 wherein when the dispensing mechanism is activated to release the outermost cleaning cartridge, the loading mechanism is configured to retain a next cleaning cartridge that is adjacent to the outermost cleaning cartridge during the release.

27. The handling unit of claim 18 further comprising a secondary channel and an extendible and retractable handle housed in the secondary channel.

\* \* \* \* \*